(12) United States Patent
Ohno

(10) Patent No.: US 12,400,480 B2
(45) Date of Patent: Aug. 26, 2025

(54) IRIS DETECTION METHOD, IRIS DETECTION APPARATUS, AND NON-TRANSITORY COMPUTER-READABLE RECORDING MEDIUM RECORDING IRIS DETECTION PROGRAM

(71) Applicants: Swallow Incubate Co., Ltd., Ibaraki (JP); Panasonic Holdings Corporation, Osaka (JP)

(72) Inventor: Toshikazu Ohno, Ibaraki (JP)

(73) Assignees: SWALLOW INCUBATE CO., LTD, Ibaraki (JP); PANASONIC HOLDINGS CORPORATION, Osaka (JP)

( * ) Notice: Subject to any disclaimer, the term of this patent is extended or adjusted under 35 U.S.C. 154(b) by 581 days.

(21) Appl. No.: 17/841,905

(22) Filed: Jun. 16, 2022

(65) Prior Publication Data

US 2022/0309833 A1   Sep. 29, 2022

Related U.S. Application Data

(63) Continuation of application No. PCT/JP2021/021994, filed on Jun. 9, 2021.

(30) Foreign Application Priority Data

Dec. 22, 2020   (JP) ................. 2020-212618

(51) Int. Cl.
| | |
|---|---|
| *G06V 40/18* | (2022.01) |
| *G06T 7/60* | (2017.01) |
| *G06T 7/70* | (2017.01) |
| *G06V 10/28* | (2022.01) |
| *G06V 10/60* | (2022.01) |
| *G06V 40/16* | (2022.01) |

(52) U.S. Cl.
CPC .............. *G06V 40/193* (2022.01); *G06T 7/60* (2013.01); *G06T 7/70* (2017.01); *G06V 10/28* (2022.01);

(Continued)

(58) Field of Classification Search
CPC ...... G06V 40/193; G06V 10/60; G06V 40/16; G06V 10/28; G06T 7/70; G06T 7/60; G06T 2207/10152; G06T 2207/30201
See application file for complete search history.

(56) References Cited

U.S. PATENT DOCUMENTS 6,418,236 B1 * 7/2002 Ellis ..................... G06V 20/69
                                                  382/128
7,268,939 B1 * 9/2007 McDowell ......... G02B 21/0016
                                                  359/368

(Continued)

FOREIGN PATENT DOCUMENTS

| JP | 11-155838 | 6/1999 |
| JP | 2006-18467 | 1/2006 |

(Continued)

OTHER PUBLICATIONS

International Search Report issued Sep. 7, 2021 in International (PCT) Application No. PCT/JP2021/021994.

*Primary Examiner* — Qun Shen
(74) *Attorney, Agent, or Firm* — Wenderoth, Lind & Ponack, L.L.P.

(57) ABSTRACT

An iris detection method includes acquiring a first image; generating a second image including an eye section of the person from the first image; generating a third image where pixels having a gradation value smaller than a threshold value are represented by a first luminance value and pixels having a gradation value equal to or greater than the threshold value are represented by a second luminance value after binarizing the second image; generating a fourth image by replacing the pixel of the second luminance value come into existence in a first luminance area having the first luminance value and satisfying a predetermined condition with the pixel of the first luminance value in the third image; calculating iris information including information about at least (Continued)

one of a position and a size of the iris of the person by use of the fourth image; and outputting the iris information.

13 Claims, 22 Drawing Sheets

(52) U.S. Cl.
CPC .............. *G06V 10/60* (2022.01); *G06V 40/16* (2022.01); *G06T 2207/10152* (2013.01); *G06T 2207/30201* (2013.01)

(56) References Cited

U.S. PATENT DOCUMENTS

| | | | | |
|---|---|---|---|---|
| 2004/0058401 | A1* | 3/2004 | Bossy | G01N 33/54326 382/128 |
| 2005/0063582 | A1 | 3/2005 | Park et al. | |
| 2015/0199570 | A1* | 7/2015 | Lee | G06V 10/945 382/103 |
| 2016/0180782 | A1* | 6/2016 | Nakaya | G09G 3/3648 345/88 |
| 2018/0018516 | A1* | 1/2018 | Odinokikh | G06V 40/193 |
| 2018/0144179 | A1 | 5/2018 | Hatakeyama et al. | |
| 2019/0385342 | A1* | 12/2019 | Freeman | G06T 11/00 |
| 2021/0382496 | A1* | 12/2021 | Yasuda | G05D 1/0219 |

FOREIGN PATENT DOCUMENTS

| | | |
|---|---|---|
| JP | 2008-210239 | 9/2008 |
| JP | 4723834 | 7/2011 |
| JP | 2014-182673 | 9/2014 |
| JP | 2018-88236 | 6/2018 |
| JP | 2020-140637 | 9/2020 |
| WO | 2020/090897 | 5/2020 |

* cited by examiner

IRIS DETECTION METHOD, IRIS DETECTION APPARATUS, AND NON-TRANSITORY COMPUTER-READABLE RECORDING MEDIUM RECORDING IRIS DETECTION PROGRAM

TECHNICAL FIELD

The present disclosure relates to a technology for detecting an iris of a person.

BACKGROUND ART

The eye detection technology for detecting information about an eye from an image has come into focus as an essential technology for estimating a state of a person, e.g., an emotion, a degree of wakefulness, and a degree of fatigue of a person. Among information about an eye, iris information about a position and a size of an iris is required to be detected at a high accuracy because the iris information may be used as basic information on the basis of which other information about an eye is detected. The following documents are known as Patent Literatures about the iris information.

For example, Patent Literature 1 discloses a technology including: determining a center of an iris according to a luminance value of a red channel in an eye bound box; setting an initial circle around the center of the iris; measuring gradients of pixels along the circle; searching a circle having the maximum gradient by enlarging the circle; and calculating the center and a radius of the circle having the maximum gradient as the center of the iris and the radius of the iris.

Patent Literature 2 discloses a technology where, in an image binarized according to a desired threshold value, a portion darker than the threshold value is defined as a target region. A contour of the target region is obtained using each of a plurality of threshold values. After having obtained contours using all the threshold values, it is determined which threshold value used for the binarization to obtain a contour provides the true contour of granula iridica.

However, according to the methods disclosed in Patent Literatures 1 and 2, the accuracy in the detection of iris information decreases when a cornea reflects external light or a background. Therefore, a further improvement is required.

CITATION LIST

Patent Literature

Patent Literature 1: Japanese Patent Publication No. 4723834

Patent Literature 2: Japanese Unexamined Patent Publication No. HEI 11-155838

SUMMARY OF INVENTION

The present disclosure has been made in order to solve the problem described above, and the object thereof is to further improve the accuracy in detection of iris information.

An iris detection method according to an aspect of the present disclosure is an iris detection method for detecting an iris of a person image taken by an image taking device by a computer of an iris detection apparatus, and includes: acquiring a first image including a face of a person; generating a second image including an eye section of the person from the first image; generating a third image where pixels having a gradation value smaller than a threshold value are represented by a first luminance value and pixels having a gradation value equal to or greater than the threshold value are represented by a second luminance value after binarizing the second image; generating a fourth image by replacing the pixel of the second luminance value come into existence in a first luminance area having the first luminance value and satisfying a predetermined condition with the pixel of the first luminance value in the third image; calculating iris information including information about at least one of a position and a size of the iris of the person by use of the fourth image; and outputting the iris information.

According to the present disclosure, the accuracy in detection of iris information can be further improved.

DESCRIPTION OF EMBODIMENTS

Figure 1:
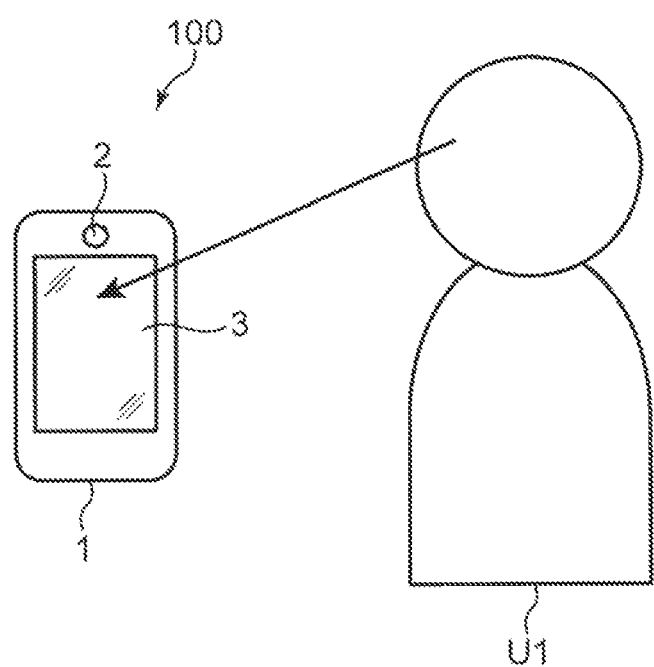
FIG. 1 is a diagram of an iris detection system according to Embodiment 1 of the present disclosure.

Circumstances that LED to the Present Disclosure

An eye of a person includes a white part and a colored part surrounded by the white part. The colored part of an eye is further divided into a pupil which is substantially circular and an iris which surrounds the pupil and has a doughnut shape, when they are viewed frontally. A dome-shaped cornea is arranged in front of the colored part of an eye when viewed frontally. When the cornea reflects external light, a background, and the like, the reflection appears as a high luminance area in the colored part of an eye. When an image of an eye including the high luminance area undergoes a binarizing process, according to which dark pixels having a pixel value smaller than a threshold value are represented by a first luminance value (for example, white) and bright pixels having a pixel value equal to or greater than the threshold value are represented by a second luminance value (for example, black), a black island-like area appears in a portion of a white region corresponding to the colored part of an eye. The black island-like area appearing in the white region prevents highly accurate detection of the iris information such as an iris center position and an iris size.

The above-described Patent Literature 1 discloses determining whether a highlight is present or not by comparing the number of pixels having the maximum luminance value in the eye bound box in a red channel image with a threshold value, and when determining that the highlight is present, setting a center point of a high-contrast area around the highlight as an iris center (paragraph [0076]).

Here, a center of a high luminance area including the reflection of external light, a background, and the like on the cornea is not necessarily located at a center of an iris region. However, Patent Literature 1 sets a center of a high-contrast area as an iris center position. Thus, Patent Literature 1 has a problem of failing to accurately detect an iris center position when a center point of a high-contrast area does not coincide with the iris center position.

In the above-described Patent Literature 2, after having obtained a contour of a target region using all the threshold values, it is determined which threshold value used for the binarization to obtain a contour provides the true contour of the granula iridica (claim 2).

However, Patent Literature 2 does not take into account the reflection of external light or a background on the cornea. Thus, Patent Literature 2 has a problem of failing to detect the iris information at a high accuracy.

Accordingly, the present inventors found that, in the binarization of an image including an eye, iris information is detectable at a high accuracy by replacing black pixels appearing in a white region with white pixels, and detecting iris information from the image after the replacement. This finding consequently led the present inventors to work out each of the following concepts of the present disclosure.

An iris detection method according to an aspect of the present disclosure is an iris detection method for detecting an iris of a person image taken by an image taking device by a computer of an iris detection apparatus, and includes: acquiring a first image including a face of a person; generating a second image including an eye section of the person from the first image; generating a third image where pixels having a gradation value smaller than a threshold value are represented by a first luminance value and pixels having a gradation value equal to or greater than the threshold value are represented by a second luminance value after binarizing the second image; generating a fourth image by replacing the pixel of the second luminance value come into existence in a first luminance area having the first luminance value and satisfying a predetermined condition with the pixel of the first luminance value in the third image; calculating iris information including information about at least one of a position and a size of the iris of the person by use of the fourth image; and outputting the iris information.

According to the present configuration, a fourth image is generated by replacing a pixel of the second luminance value come into existence in a first luminance area and satisfying a predetermined condition with a pixel of the first luminance value in the third image. Thus, an island-like area which has the second luminance value and appears in a portion corresponding to a colored part of an eye in the first luminance area is blotted with the first luminance value. Subsequently, the iris information is calculated using the fourth image which is the blotted binary image. Thus, the influence of external light or a background reflected on the cornea is suppressed, thereby enabling a further improvement in the detection accuracy of iris information.

In the generation of the fourth image in the iris detection method, an uppermost pixel which is a pixel of the first luminance value and first appears in an upper end side on each of a plurality of vertical lines of the third image and a lowermost pixel which is a pixel of the first luminance value and first appears in a lower end side on each of the vertical lines of the third image may be respectively detected, and pixels of the second luminance value between the uppermost pixel and the lowermost pixel may be judged as a pixel having the second luminance value and satisfying the predetermined condition when a distance between the uppermost pixel and the lowermost pixel is longer than a first reference distance.

According to the present configuration, replaced with pixels of the first luminance value are pixels of the second luminance value which lie between an uppermost pixel and a lowermost pixel on vertical lines having a distance between the uppermost pixel and the lowermost pixel longer than the first reference distance. Thus, the above-described replacement can be performed on the vertical lines constituting the portion corresponding to the colored part of an eye among the vertical lines constituting the third image. Consequently, the island-like area of the second luminance value lying in the portion corresponding to the colored part of an eye can be intensively blotted with the first luminance value.

In the iris detection method, the first luminance value may be greater than the second luminance value, and in the generation of the fourth image, the third image may be divided in a lateral direction into a plurality of local regions each having a predetermined number of pixels, an average luminance value of each local region may be calculated, a center position of the local region having the highest average luminance value may be calculated as an estimated iris center position, and a judgement as to whether a pixel satisfies the predetermined condition or not may be made to only a pixel of the second luminance value within a second reference distance from the estimated iris center position on the vertical line.

The colored part of an eye is substantially circular. Thus, when a third image is divided in a lateral direction into a plurality of local regions each having a predetermined number of pixels, the closer a local region is to the center of the colored part of an eye, the higher is an average luminance value thereof. The local region including the center of the colored part of an eye has the highest average luminance value. According to the present configuration, the first luminance value is set to be greater than the second luminance value, and a central position of the local region having the highest average luminance value among the local regions is defined as the estimated iris center position. According to the present configuration, an iris center position can be estimated by an easy process.

The portion corresponding to the colored part of an eye is presumed to be arranged within a certain distance from the estimated iris center position. According to the present configuration, the above-described replacement is executed only on the vertical lines within a second reference distance from the estimated iris center position. Thus, the above-described replacement can be performed to the vertical lines situated within the portion corresponding to the colored part of an eye. The configuration prevents the blotting processing from being executed on the white part of an eye.

In the calculation of the iris information in the iris detection method, a first pixel which has the second luminance value and first appears from the estimated iris center position to a left side in the lateral direction in the fourth image and a second pixel which has the second luminance value and first appears from the estimated iris center position to a right side in the lateral direction in the fourth image may be respectively detected, and a middle position between the first pixel and the second pixel may be calculated as an iris center position in the lateral direction.

According to the present configuration, the detection of a first pixel having the second luminance value starts from the estimated iris center position and proceeds toward a left side in the lateral direction in the fourth image where the island-like area of the second luminance value is blotted with the first luminance value, whereas the detection of a second pixel having the second luminance value proceeds toward a right side in the lateral direction in the fourth image, and a middle position between the first pixel and the second pixel is calculated as an iris center position in the lateral direction. Therefore, the iris center position in the lateral direction can be accurately calculated.

In the calculation of the iris information in the iris detection method, a third pixel which has the second luminance value and first appears from the estimated iris center position to an upper side in a vertical direction in the fourth image and a fourth pixel which has the second luminance value and first appears from the estimated iris center position to a lower side in the vertical direction in the fourth image may be respectively detected, and a middle position between the third pixel and the fourth pixel may be calculated as an iris center position in the vertical direction.

According to the present configuration, the detection of a third pixel having the second luminance value starts from the estimated iris center position and proceeds toward an upper side in a vertical direction in the fourth image where the portion corresponding to the colored part of an eye is blotted with the first luminance value, whereas the detection of a fourth pixel having the second luminance value proceeds toward a lower side in the vertical direction in the fourth image, and a middle position between the third pixel and the fourth pixel is calculated as an iris center position in the vertical direction. Therefore, the iris center position in the vertical direction can be accurately calculated.

In the iris detection method, respective positions of upper and lower eyelids may be further detected based on the third image.

According to the present configuration, respective positions of upper and lower eyelids are detected based on the third image obtained during the processing of calculating the iris information. Therefore, the positions of the upper and lower eyelids can be detected concurrently with the calculation of the iris information.

In the detection of the position of the eyelid in the iris detection method, the position of the eyelid may be detected by performing a morphological gradient operation to the third image.

According to the present configuration, respective positions of upper and lower eyelids are detected by performing a morphological gradient operation on the binarized third image. Therefore, the positions of the upper and lower eyelids can be accurately calculated.

In the iris detection method, the third image may be a binary image of one of a left eye and a right eye of the person, and the method may further include detecting respective positions of an eye outer corner and an eye inner corner based on the third image.

According to the present configuration, respective positions of the eye outer corner and the eye inner corner are detected based on the binarized third image obtained during the processing of calculating the iris information. Therefore, the positions of the eye outer corner and the eye inner corner can be detected concurrently with the calculation of the iris information.

In the detection of the respective positions of the eye outer corner and the eye inner corner in the iris detection method, a position of a leftmost pixel having the first luminance value in the lateral direction in the third image may be detected as a position of one of the eye outer corner and the eye inner corner, and a position of a rightmost pixel having the first luminance value in the lateral direction in the third image may be detected as a position of the other of the eye outer corner and the eye inner corner.

According to the present configuration, in the third image that is a binary image of one of the left eye and the right eye, a position of a leftmost pixel having the first luminance value in the lateral direction is detected as a position of one of the eye outer corner and the eye inner corner, and a position of a rightmost pixel having the first luminance value in the lateral direction is detected as a position of the other of the eye outer corner and the eye inner corner. Therefore, positions of the eye outer corner and the eye inner corner can be easily detected.

In the iris detection method, information about both eyes of the person may be further calculated based on the positions of the eye outer corner and the eye inner corner.

According to the present configuration, information about both eyes of a person is calculated based on the positions of the eye outer corner and the eye inner corner. Therefore, for example, information providing a resource for diagnosing diseases in connection with an eye of a person can be calculated.

In the iris detection method, positions of upper and lower eyelids and positions of an eye outer corner and an eye inner corner may be further detected in the third image, and a distance between the iris center position and the position of the upper eyelid, a distance between the iris center position and the position of the lower eyelid, a distance between the iris center position and the position of the eye outer corner, and a distance between the iris center position and the position of the eye inner corner may be calculated based on the detection results.

According to the present configuration, a distance between an iris center position and a position of an upper eyelid, a distance between the iris center position and a position of a lower eyelid, a distance between the iris center position and a position of an eye outer corner, and a distance between the iris center position and a position of an eye inner corner are calculated. Therefore, an emotion of a person and a state of a person can be estimated using these distances.

In the iris detection method, the iris information may be further displayed in such a manner as to be superimposed on a facial image of the person shown on a display.

According to the present configuration, the iris information is superimposedly displayed on a facial image of the person shown on the display. Therefore, the calculation results of the iris information can be displayed on the facial image in real time.

An iris detection apparatus according to another aspect of the present disclosure is an iris detection apparatus for detecting an iris of a person image taken by an image taking device, and includes: an image acquisition part for acquiring a first image including a face of a person; an eye section detection part for detecting a second image including an eye section of the person from the first image; a binarization processing part for generating a third image where pixels having a luminance lower than a threshold value are represented by a first luminance value and pixels having a luminance equal to or higher than the threshold value are represented by a second luminance value after binarizing the second image; a replacement part for generating a fourth image by replacing the pixel of the second luminance value come into existence in a first luminance area having the first luminance value and satisfying a predetermined condition with the pixel of the first luminance value in the third image; an iris information calculation part for calculating iris information including information about at least one of a position and a size of the iris of the person by use of the fourth image; and an output part for outputting the iris information.

An iris detection program according to another aspect of the present disclosure is an iris detection program causing a computer to function as an iris detection apparatus for detecting an iris of a person image taken by an image taking device, and causes the computer to function as: an image acquisition part for acquiring a first image including a face of a person; an eye section detection part for detecting a second image including an eye section of the person from the first image; a binarization processing part for generating a third image where pixels having a luminance lower than a threshold value are represented by a first luminance value and pixels having a luminance equal to or higher than the threshold value are represented by a second luminance value after binarizing the second image; a replacement part for generating a fourth image by replacing the pixel of the second luminance value come into existence in a first luminance area having the first luminance value and satisfying a predetermined condition with the pixel of the first luminance value in the third image; an iris information calculation part for calculating iris information including information about at least one of a position and a size of the iris of the person by use of the fourth image; and an output part for outputting the iris information.

According to these configurations, the same advantageous effects as the iris detection method described above can be obtained.

The present disclosure may be implemented as an iris detection system which operates based on such iris detection program. It is needless to say that the computer program may be distributed via a computer-readable non-transitory recording medium such as a CD-ROM or a communication network such as Internet.

In addition, each of the embodiments described below shows a specific example of the present disclosure. The numerical values, shapes, constituent elements, steps, order of steps, and the like shown in the following embodiments are merely examples, and are not intended to delimit the present disclosure. Also, among the constituent elements in the following embodiments, constituent elements not recited in the independent claims representing the broadest concepts are described as optional constituent elements. In all the embodiments, the respective contents may also be combined.

Embodiment 1

FIG. 1 is a diagram of an iris detection system 100 according to Embodiment 1 of the present disclosure. The iris detection system 100 includes a portable terminal device, e.g., a smartphone, and a tablet terminal. However, this is merely an example. The iris detection system 100 may include a proper combination of a stationary computer or a cloud server, a camera, and a display.

The iris detection system 100 includes an iris detection apparatus 1, an image taking device 2, and a display 3. The iris detection apparatus 1 calculates iris information on a person image U1 taken by the image taking device 2.

The image taking device 2 includes a camera mounted on the portable terminal device. The image taking device 2 is a camera capable of taking a colored visible-light image at a predetermined frame rate.

The display 3 includes a display device, e.g., a liquid crystal display device or an organic EL (Electro Luminescence) display device mounted on the portable terminal device. The display 3 displays an image of a face of a person U1 taken by the image taking device 2. Further, the display 3 superimposedly displays later-described iris information calculated by the iris detection apparatus 1 over the image of the face of the person U1.

Figure 2:
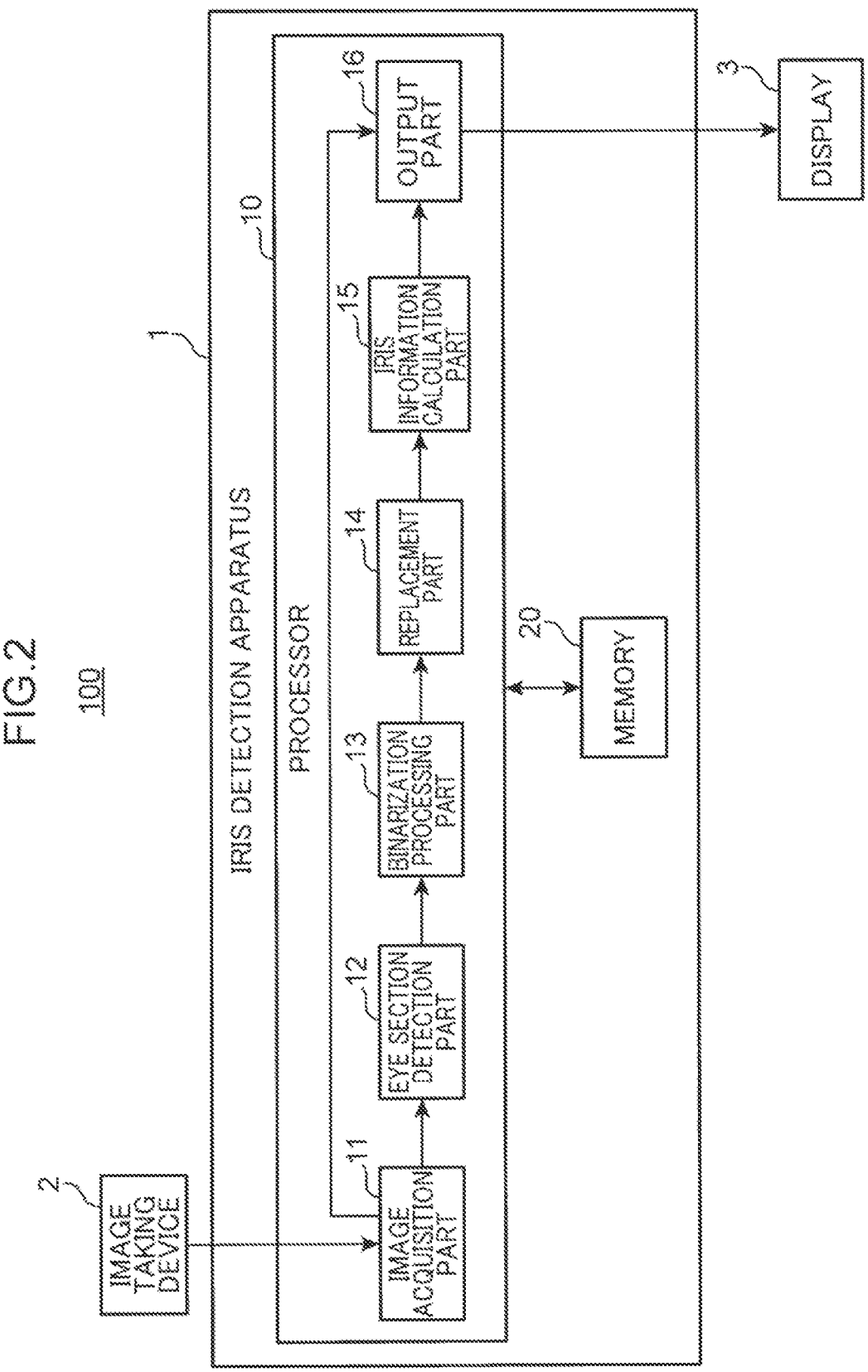
FIG. 2 is a block diagram showing an exemplary general configuration of the iris detection system according to Embodiment 1 of the present disclosure.

FIG. 2 is a block diagram showing an exemplary general configuration of the iris detection system 100 according to Embodiment 1 of the present disclosure. The iris detection apparatus 1 includes a processor 10 and memory 20. The processor 10 includes, for example, a CPU (Central Processing Unit). The processor 10 includes an image acquisition part 11, an eye section detection part 12, a binarization processing part 13, a replacement part 14, an iris information calculation part 15, and an output part 16. The image acquisition part 11 to the output part 16 are embodied by causing, for example, the processor 10 to execute an iris detection program.

The image acquisition part 11 acquires an image taken by the image taking device 2. Here, the image to be acquired includes a face of the person U1. Hereinafter, an image including a face is referred to as a facial image. The image acquisition part 11 sequentially acquires facial images taken at a predetermined frame rate. The facial image is an exemplary first image including a face of a person.

The eye section detection part 12 detects a face region representing the face of a person from the facial image acquired by the image acquisition part 11. The eye section detection part 12 may detect the face region by inputting the facial image into a classifier prepared in advance for detecting the face region. This classifier includes, for example, a Haar cascade classifier. The face region is a rectangular region having such a size as to include, for example, the entire face.

The eye section detection part 12 detects an eye detection section by inputting the facial image into a classifier prepared in advance for detecting the eye detection section from the face region. This classifier includes, for example, a Haar cascade classifier. The eye detection section is a rectangular section having a size of the left eye or the right eye added with a predetermined margin. The eye section detection part 12 detects an eye detection section including the left eye and an eye detection section including the right eye from the face region, respectively. The eye detection section is an exemplary second image including an eye section of a person. Hereinafter, the eye detection section including the left eye is referred to as "the left eye detection section", and the eye detection section including the right eye is referred to as "the right eye detection section". Both sections are simply referred to as "an eye detection section" when the reference is made without distinction. Further, the left eye is the eye situated on the left side when the person U1 is viewed frontally. The right eye is the eye situated on the right side when the person U1 is viewed frontally. However, this is merely an example, and the relationship may be inverted.

The binarization processing part 13 binarizes the eye detection section, and generates a binary image where pixels having a gradation value lower than a threshold value are represented by a first luminance value, and pixels having a gradation value equal to or higher than the threshold value are represented by a second luminance value. The binary image is an exemplary third image. When the eye detection section includes a colored image, the binarization processing part 13 may convert the eye detection section to a grayscale image having a gradation value between 0 and 255 inclusive, for example, and execute processing of binarization on the converted grayscale image. As the processing of binarization, for example, Otsu's binarization processing can be adopted. The first luminance value represents, for example, white, and the second luminance value represents, for example, black. Specifically, in the present Embodiment, a binary image has a dark area represented in white and a bright area represented in black. The luminance value of white is, for example, denoted by 255, and the luminance value of black is, for example, denoted by 0.

Here, the image taken by the image taking device 2 is an image quantized to 8 bits. Thus, the grayscale image has gradation values between 0 and 255 inclusive. However, this is merely an example. When an image taken by the image taking device 2 is quantized to another number of bits, e.g., 16 bits, the grayscale image may have gradation values which can be expressed by the relevant number of bits.

The binarization processing part 13 may generate a binary image of each of the left eye detection section and the right eye detection section.

The replacement part 14 executes, on a binary image, blotting processing of replacing a black pixel that appears in the white region (first luminance region) constituted by the white pixels and satisfies a predetermined condition with a white pixel. The replacement part 14 executes the blotting processing on each of the left eye detection section and the right eye detection section. A binary image is thus generated to have a portion corresponding to the colored part of an eye (hereinafter, referred to as colored part) where a black island-like area has been blotted out by white pixels in the white region. The binary image resulting from the blotting processing is an exemplary fourth image.

Specifically, the replacement part 14 detects an uppermost pixel which is a first appearing white pixel in an upper end side on each of a plurality of vertical lines of the binary image and a lowermost pixel which is a first appearing white pixel in a lower end side on each of the vertical lines of the binary image, respectively. Thereafter, the replacement part 14 judges that a black pixel between the uppermost pixel and the lowermost pixel is a black pixel satisfying the predetermined condition when a distance between the uppermost pixel and the lowermost pixel is longer than a first reference distance.

Further, the replacement part 14 divides the binary image in a lateral direction into a plurality of local regions each having a predetermined number of pixels, calculates an average luminance value of each local region, calculates a center position of the local region having a highest average luminance value as an estimated iris center position, and judges whether a pixel satisfies the predetermined condition or not only about black pixels on the vertical lines within a second reference distance from the estimated iris center position.

The iris information calculation part 15 calculates iris information including information about at least one of a position and a size of the iris of the person by use of the binary image resulting from the blotting processing. The information about the position of the iris includes an iris center position. The information about the size of the iris includes an iris radius and an outer edge of the iris.

Figure 6:
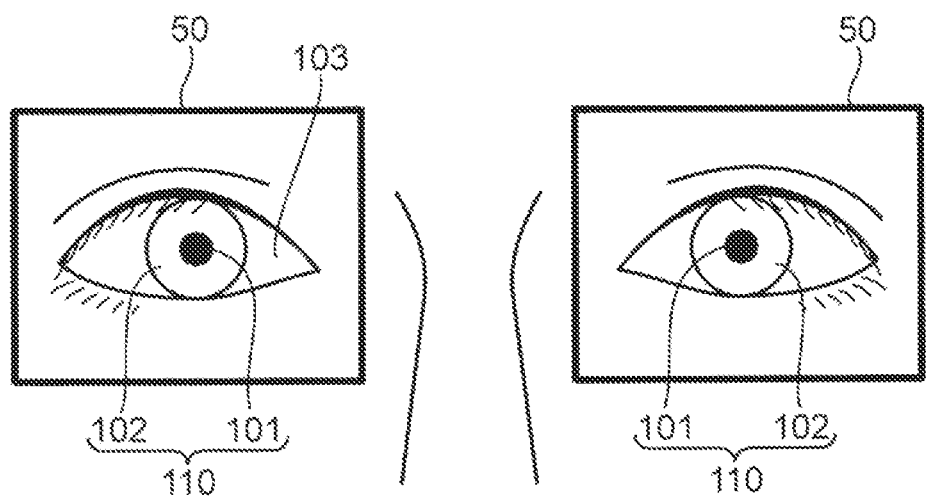
FIG. 6 is an illustration showing eye detection sections.

Reference is made to FIG. 6. In the present Embodiment, an eye includes a white part 103 of an eye and a colored part 110 of an eye that is surrounded by the white part 103 of an eye and is circular when viewed frontally. The colored part 110 of an eye includes a pupil 101 that is circular and an iris 102 that surrounds the pupil 101 and has a doughnut shape, when they are viewed frontally. In the present Embodiment, a center position of the iris 102, a center position of the colored part 110 of an eye, and a center position of the pupil 101 are assumed to coincide with one another. The radius of the iris 102 is a distance from the center position of the iris 102 to the outer edge of the iris 102.

The output part 16 generates a display picture by superimposing the iris information calculated by the iris information calculation part 15 over a facial image acquired by the image acquisition part 11, and displays the display picture on the display 3.

The memory 20 includes, for example, a RAM (Random Access Memory), and is used as a work area of the processor 10.

Figure 3:
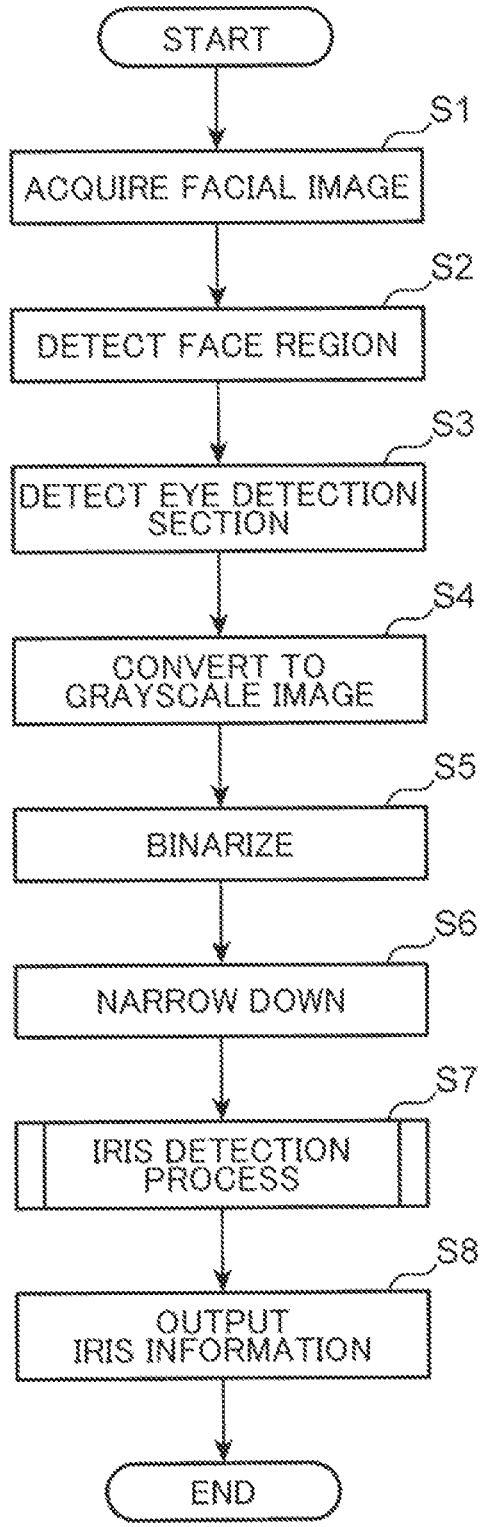
FIG. 3 is a flowchart showing an exemplary process of an iris detection apparatus according to Embodiment 1 of the present disclosure.

Hereinafter, processes by the iris detection apparatus 1 shown in FIG. 2 will be described. FIG. 3 is a flowchart showing an exemplary process of an iris detection apparatus 1 according to Embodiment 1 of the present disclosure. The flowchart shown in FIG. 3 is executed at a predetermined sampling interval. The predetermined sampling interval is, for example, a frame interval of the image taking device 2.

Figure 5:
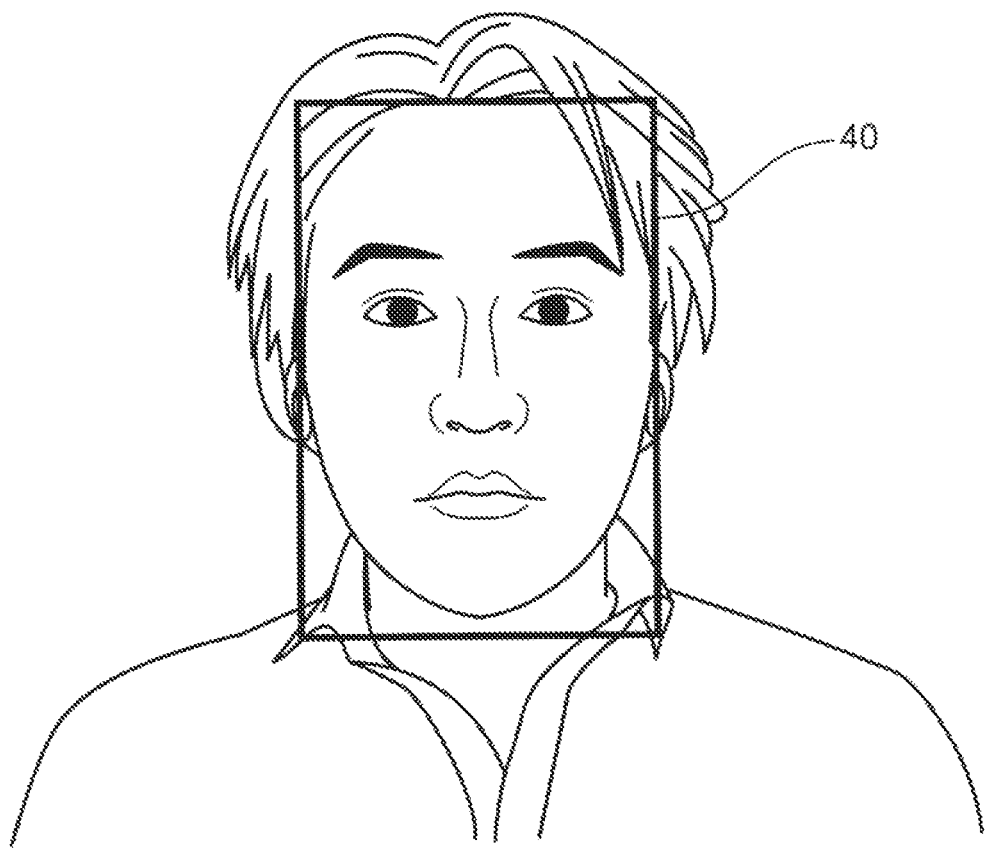
FIG. 5 is an illustration showing a face region.

In Step S1, the image acquisition part 11 acquires a facial image from the image taking device 2. In Step S2, the eye section detection part 12 inputs the facial image into a classifier for detecting the face region, and detects the face region. FIG. 5 is an illustration showing a face region 40. As can be seen in FIG. 5, the eye section detection part 12 has detected a region having a rectangular shape and including an upper portion of the forehead, a lower portion of the chin, and roots of the ears as the face region 40. Here, the face region 40 does not include the entire hair. However, the face region 40 may be a region that includes the entire hair. In FIG. 5, the facial image is an image of a person U1 taken frontally. Thus, the facial image includes a left eye and a right eye.

In Step S3, the eye section detection part 12 detects an eye detection section by inputting the face region 40 extracted in Step S2 into a classifier for detecting the eye detection section. FIG. 6 is an illustration showing eye detection sections 50. As can be seen in FIG. 6, the eye detection section 50 is a section having a rectangular shape, including the entire area of an eye, and having a size of the eye added with a slight margin. In FIG. 6, the left and right eye detection sections 50 are extracted, respectively.

In Step S4, the binarization processing part 13 converts the eye detection section 50 detected in Step S3 to a grayscale image. Processing of calculating an average gradation value of each of a red component, a green component, and a blue component in each pixel constituting the eye detection section 50 can be adopted as processing of conversion to a grayscale image. However, this is merely an example. Other processings may be adopted as the processing of conversion to a grayscale image.

Figure 7:
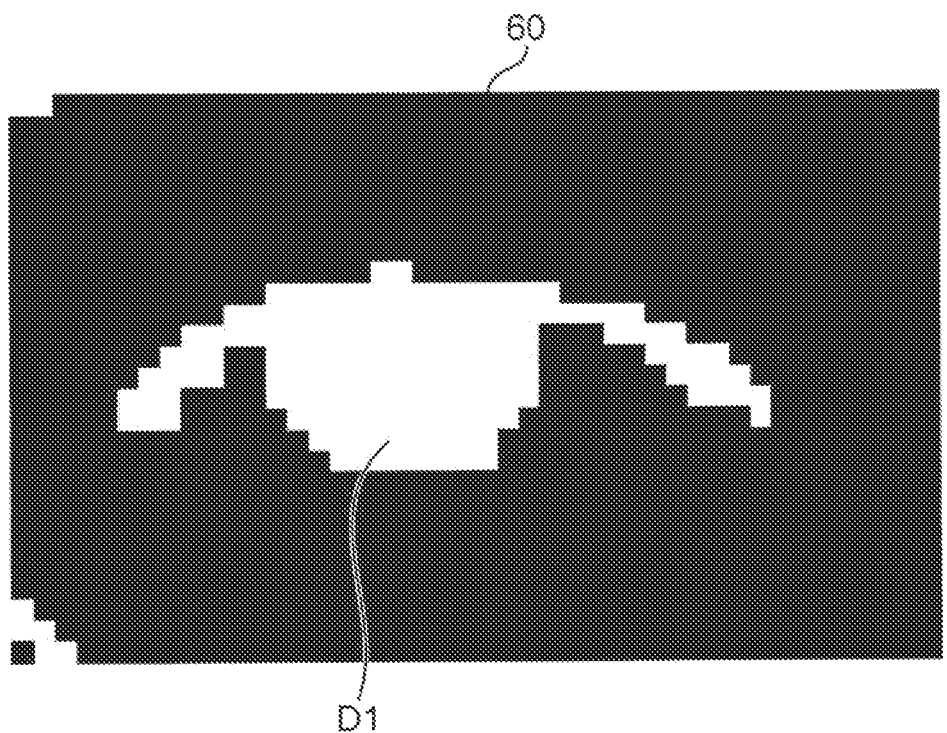
FIG. 7 is an illustration showing an exemplary binary image.
Figure 12:
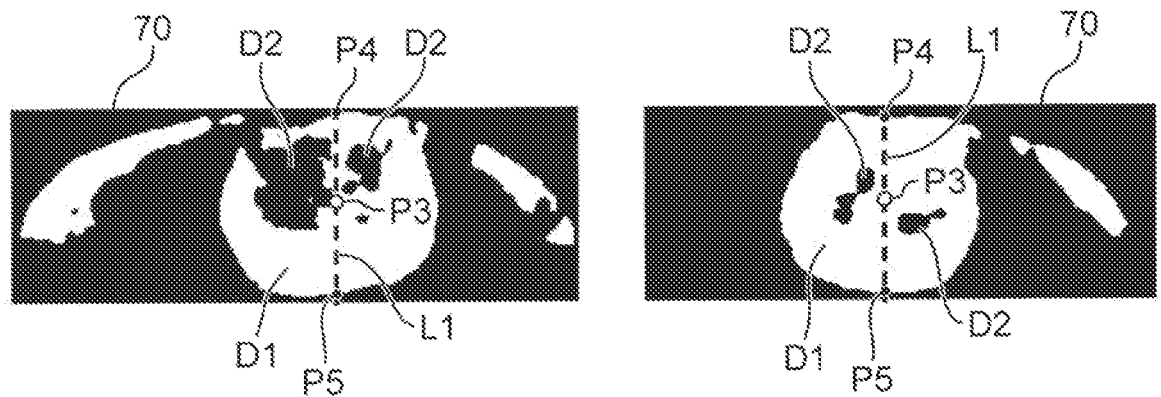
FIG. 12 is an illustration showing binary images each including black island-like areas appearing in a colored part of an eye.

In Step S5, the binarization processing part 13 generates a binary image 60 by binarizing the eye detection section 50 having been converted to a grayscale image. FIG. 7 is an illustration showing an exemplary binary image 60. In the example shown in FIG. 7, a binary image 60 is generated to have dark portions such as the colored part of an eye and eyelashes represented in white and bright portions such as the white part of an eye and the skin represented in black in the eye detection section 50. In the example shown in FIG. 7, information about an eye is represented by a lump of white region D1 constituted by white pixels. In the example shown in FIG. 7, no black island-like area is appeared in the white region D1 because the reflection of external light or a background on the cornea is small. A black island-like area D2 appears as shown in FIG. 12 when there is some reflection on the cornea.

Figure 8:
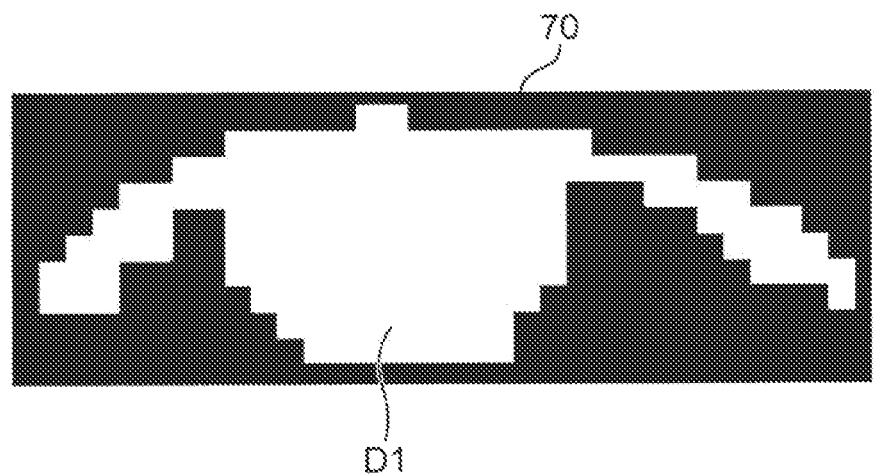
FIG. 8 is an illustration showing an exemplary binary image resulting from processing of narrowing-down.

In Step S6, the binarization processing part 13 generates a binary image 70 by applying the processing of narrowing down of removing unnecessary black region around the white region D1 to the binary image 60. FIG. 8 is an illustration showing an exemplary binary image 70 resulting from the processing of narrowing-down. In the example of FIG. 8, the binary image 70 is generated by setting a circumscribed rectangle about the white region D1 in the binary image 60, and excluding the black region outside the circumscribed rectangle. This processing eliminates a double eyelid, a dark circle under an eye, a mole around an eye, and eyeglasses around an eye. Consequently, the accuracy of the subsequent processings can be increased.

Figure 9:
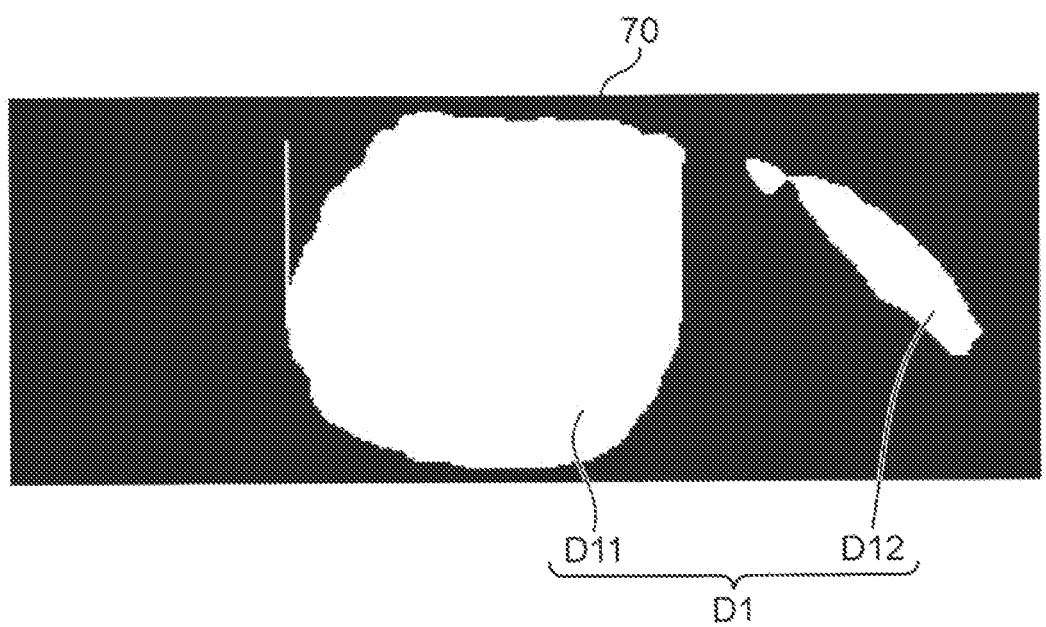
FIG. 9 is an illustration showing another exemplary binary image.

FIG. 9 is an illustration showing another exemplary binary image 70. In the example shown in FIG. 9, the white region D1 is separated into a white sub-region D11 representing the colored part of an eye and a white sub-region D12 representing eyelashes. When the white sub-region D11 representing the colored part of an eye is formed as shown in the example of FIG. 9, a vertical and horizontal midpoint of the white sub-region D11 may be also determined as the iris center position.

However, the eyelashes and the colored part of an eye are likely to appear as a lump of white region D1 as shown in FIG. 8 because of causal factors of thickness of eyelashes, heaviness of makeup around the eyelashes, and decoration items such as false eyelashes and eyelash extensions of the person U1. In this case, if the vertical and horizontal midpoint of the white region D1 is simply determined to be the iris center position, the determined iris center position will noticeably deviate from the actual iris center position, which consequently decreases the detection accuracy of the iris center position. Accordingly, in the present Embodiment, the detection accuracy of the iris center position is increased owing to the execution of the iris detection process described below.

In Step S7, the replacement part 14 and the iris information calculation part 15 calculates the iris information by applying an iris detection process to the binary image 70. Details on an iris information detection process will be described later with reference to the flowchart in FIG. 4.

In Step S8, the output part 16 generates a display picture in which the iris information calculated in Step S7 is superimposed over the facial image acquired in Step S1, and displays the display picture on the display 3. The flowchart shown in FIG. 3 is repeated at a predetermined sampling interval, thereby causing a display picture containing iris information superimposed over a facial image to be displayed on the display 3 in real time.

Figure 4:
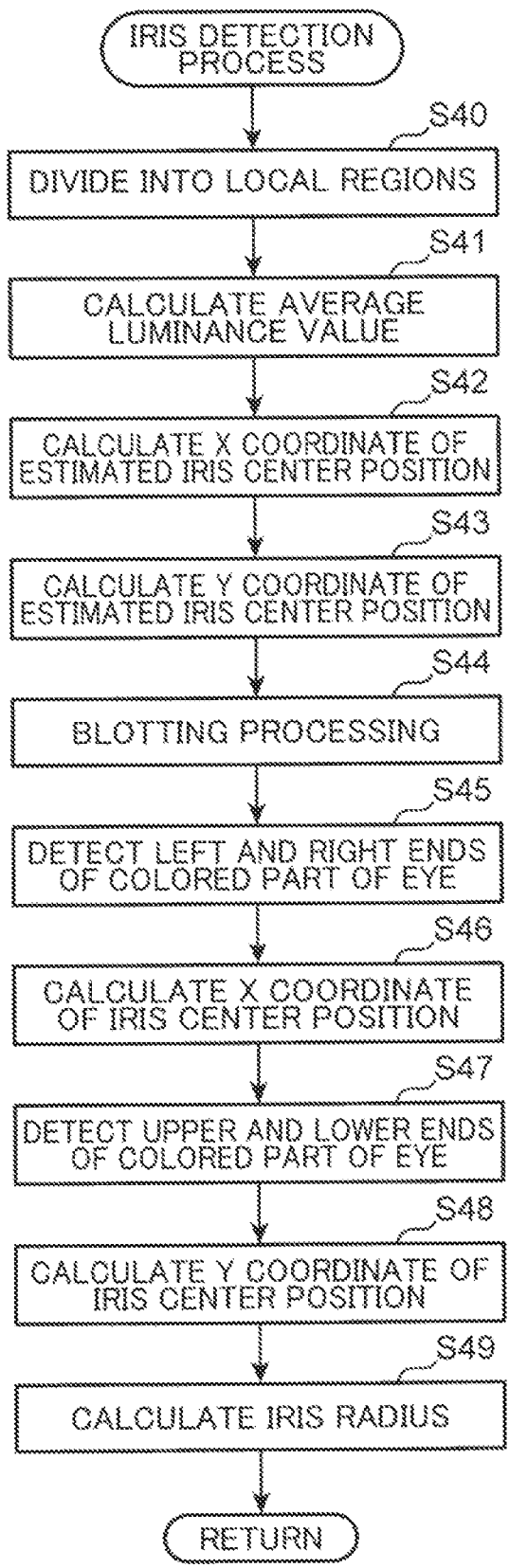
FIG. 4 is a flowchart showing an exemplary iris detection process.
Figure 10:
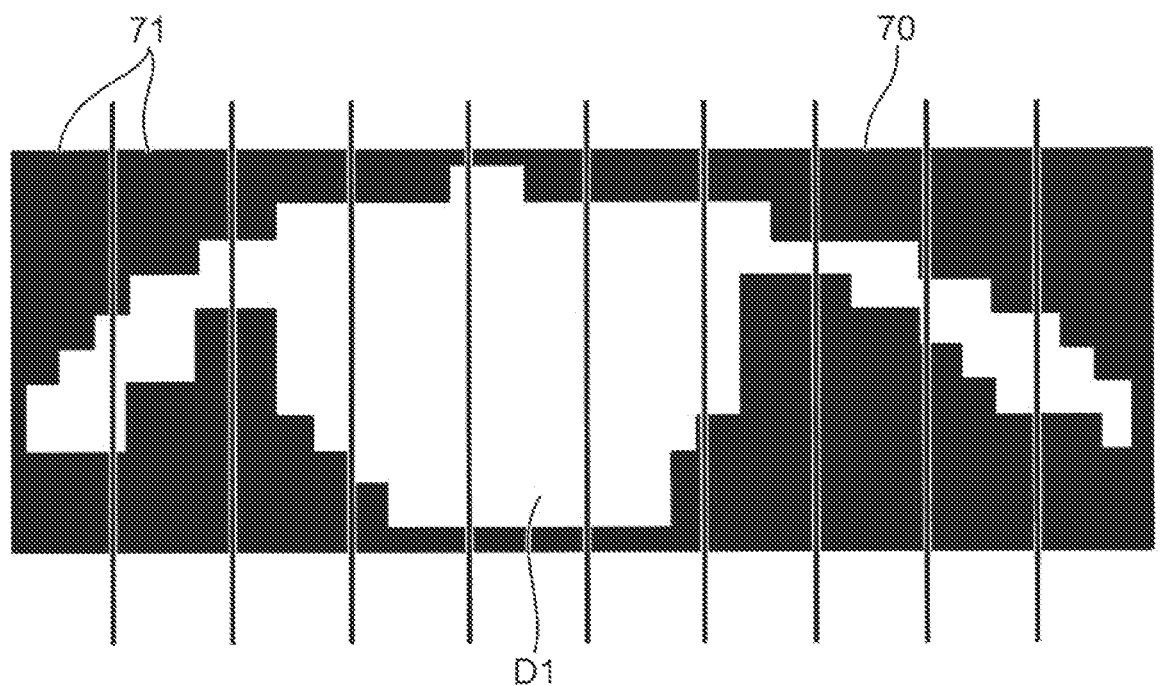
FIG. 10 is an illustration showing local regions.

Hereinafter, details on the iris detection process will be described. FIG. 4 is a flowchart showing an exemplary iris detection process. In Step S40, the replacement part 14 divides the binary image 70 in an X direction into a plurality of local regions each having a predetermined number of pixels. FIG. 10 is an illustration showing local regions 71. The X direction is a lateral direction (horizontal direction) of the image taken by the image taking device 2. In an example shown in FIG. 10, the replacement part 14 equally divides the binary image 70 in the lateral direction into ten. As a result, the binary image 70 is divided into ten strip-shaped local regions 71 having a Y direction as the longitudinal direction. Here, the replacement part 14 divides the binary image 70 into ten local regions 71. However, this is merely an example. The number into which the binary image is divided may be an integer of 2 or greater and 9 or smaller or an integer of 11 or greater as well. The Y direction is a vertical (perpendicular) direction of the image taken by the image taking device 2.

In Step S41, the replacement part 14 calculates an average luminance value of each of the ten local regions 71. Here, the luminance value of white is 255, whereas the luminance value of black is 0. Therefore, for example, the average luminance value is calculated by the following equation.

Average Luminance Value=Number of White Pixels in Local Region 71×255/Number of Pixels in Local Region 71

Figure 11:
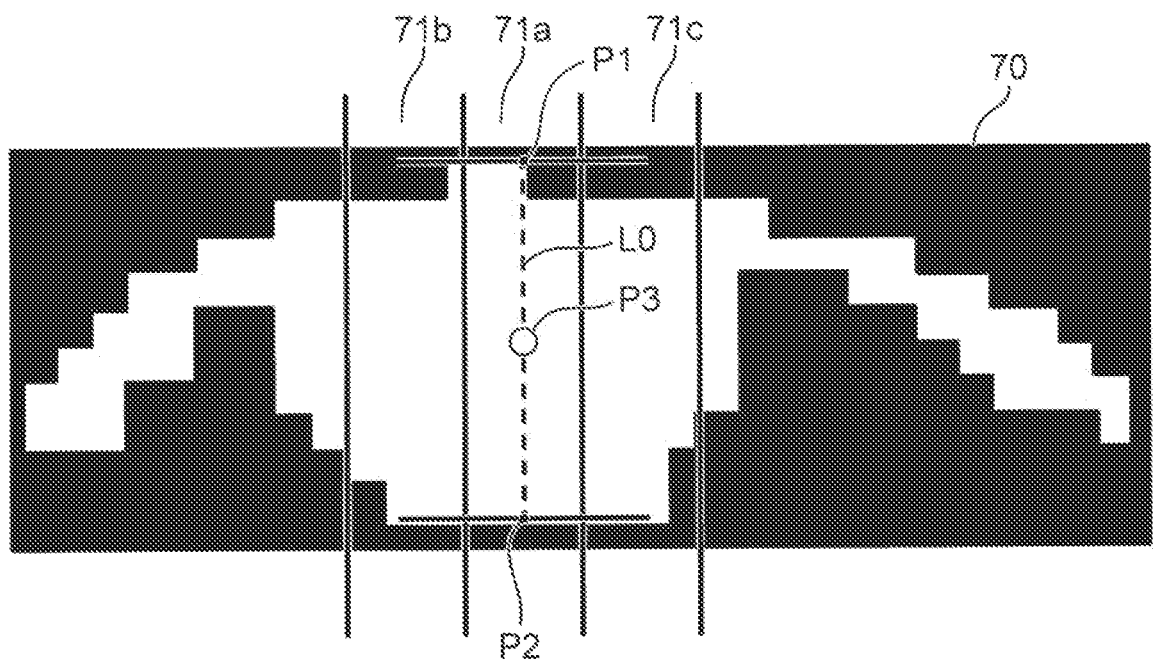
FIG. 11 is an illustration showing an estimated iris center position.

In Step S42, the replacement part 14 calculates the X coordinate of an estimated iris center position. FIG. 11 is an illustration showing the estimated iris center position P3. The estimated iris center position P3 is an estimated position of the iris center position, which is different from an iris center position to be finally calculated. Because of a double eyelid, density of eyelashes, false eyelashes, and the like, the relevant portions are likely to appear as a large white region D1. In this case, the portion of the white part 103 of an eye is liable to be blotted out. In the present Embodiment, the estimated iris center position P3 is calculated in order to avoid such situation.

In an example shown in FIG. 11, the fifth local region 71a to the left has the highest average luminance value. Hence, the replacement part 14 calculates a coordinate of a middle point of the local region 71a in the X direction as the X coordinate of the estimated iris center position P3. However, depending on the width of a local region 71 in the X direction, a middle point of the local region 71 in the X direction may be inappropriate as the X coordinate of the estimated iris center position P3. In this case, a left end or a right end of the local region 71 in the X direction may be calculated as the X coordinate of the estimated iris center position P3.

In Step S43, the replacement part 14 calculates a Y coordinate of the estimated iris center position P3. The replacement part 14 detects an uppermost white pixel point P1 and a lowermost white pixel point P2 from the local region 71a by referring to FIG. 11, and calculates a middle point between the uppermost point P1 and the lowermost point P2 as the Y coordinate of the estimated iris center position P3. The uppermost point P1 and the lowermost point P2 are liable to appear in a left adjacent local region 71b or a right adjacent local region 71c because of casual factors such as eyelashes or a makeup. Therefore, it may be appreciated that the replacement part 14 calculates an uppermost point and a lowermost point in each of the local regions 71a to 71c, obtains an average uppermost point by averaging the three calculated uppermost points and an average lowermost point by averaging the three calculated lowermost points, and thus calculates a middle point between the average uppermost point and the average lowermost point as the Y coordinate of the estimated iris center position P3.

In Step S44, the replacement part 14 executes blotting processing on the binary image 70. In a visible-light image, external light or a background is liable to be reflected on the cornea depending on the brightness of the surroundings and the like. When the reflection is large, a bright-colored area such as a white area appears in the colored part of an eye that is black or brown. In this case, when an eye image is binarized, a black island-like area appears in the colored part, which impedes the detection of iris information at a high accuracy. Accordingly, the processing of blotting is executed in the present Embodiment.

FIG. 12 is an illustration showing binary images 70 each including a colored part in which black island-like areas D2 are appeared. In FIG. 12, the left figure shows the binary image 70 of the left eye, whereas the right figure shows the binary image 70 of the right eye. It can be seen in FIG. 12 that the black island-like areas D2 are appeared as a dot in a portion of the white region D1 situated at the center thereof and corresponding to the colored part of an eye in both the left and right binary images 70. The blotting processing is the processing of blotting out these black island-like areas D2.

Details on the blotting processing are as follows. First, the replacement part 14 sets a vertical line L1 parallel to the Y direction at the X coordinate of the estimated iris center position P3 in the binary image 70. Thereafter, the replacement part 14 detects a white pixel which first appears in an upper end side on the vertical line L1 of the binary image 70 as an uppermost pixel P4. Subsequently, the replacement part 14 detects a white pixel which first appears in a lower end side on the vertical line L1 of the binary image 70 as a lowermost pixel P5. Thereafter, the replacement part 14 determines whether a distance between the uppermost pixel P4 and the lowermost pixel P5 is longer than a first reference distance. Subsequently, when determining that the distance between the uppermost pixel P4 and the lowermost pixel P5 is longer than the first reference distance, the replacement part 14 judges that a black pixel situated between the uppermost pixel P4 and the lowermost pixel P5 on the vertical line L1 is a black pixel satisfying a predetermined condition, and replaces the black pixel with a white pixel. On the other hand, when determining that the distance between the uppermost pixel P4 and the lowermost pixel P5 is equal to or shorter than the first reference distance, the replacement part 14 does not execute the replacement on the vertical line L1. For example, a proper distance having an assumed iris diameter as a reference is adopted as the first reference distance.

The replacement part 14 executes the blotting processing on each vertical line L1 arranged within a range of a left reference distance on the left of the estimated iris center position P3 in the X direction, and on each vertical line L1 arranged within a range of a right reference distance on the right of the estimated iris center position P3 in the X direction. An example of a second reference distance is a sum of the left reference distance range and the right reference distance range. For example, the left reference distance range and the right reference distance range have the same length. For example, a distance slightly longer than the assumed iris diameter is adopted as the second reference range. As a result, the blotting processing can be intensively applied to the vertical lines L1 falling within the colored part.

Figure 13:
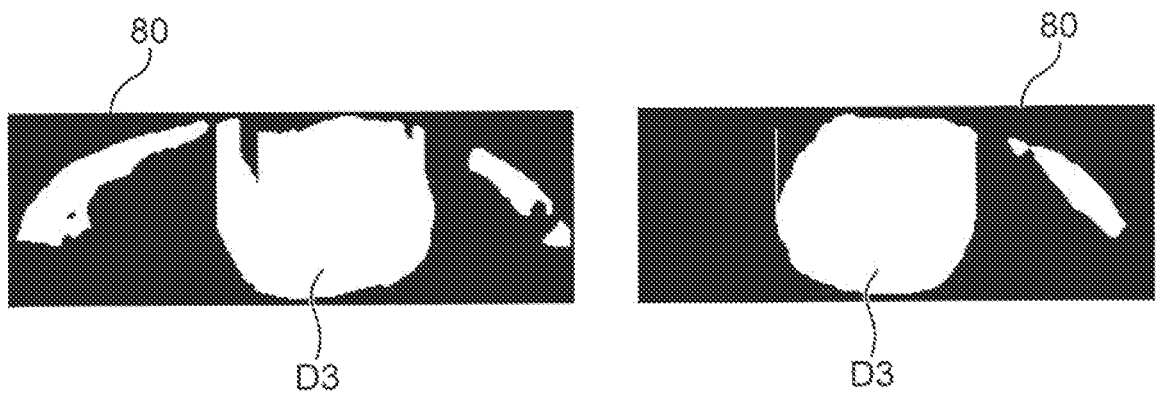
FIG. 13 is an illustration showing binary images obtained after blotting processing.

FIG. 13 is an illustration showing binary images 80 obtained after blotting processing. The left drawing in FIG. 13 shows a binary image 80 that is obtained by applying the blotting processing to the left binary image 70 in FIG. 12. The right drawing in FIG. 13 shows a binary image 80 that is obtained by applying the blotting processing to the right binary image 70 in FIG. 12. As can be seen in FIG. 13, the black island-like areas D2, which are shown in FIG. 12, are blotted out by white pixels, and consequently, a lump of white region D3 constituted by white pixels is formed. On the other hand, it can be seen that the blotting processing has not been applied to the black island-like areas located at the portion of eyelashes. In other words, it can be seen that the vertical lines L1 falling within the colored part are intensively blotted out.

Figure 14:
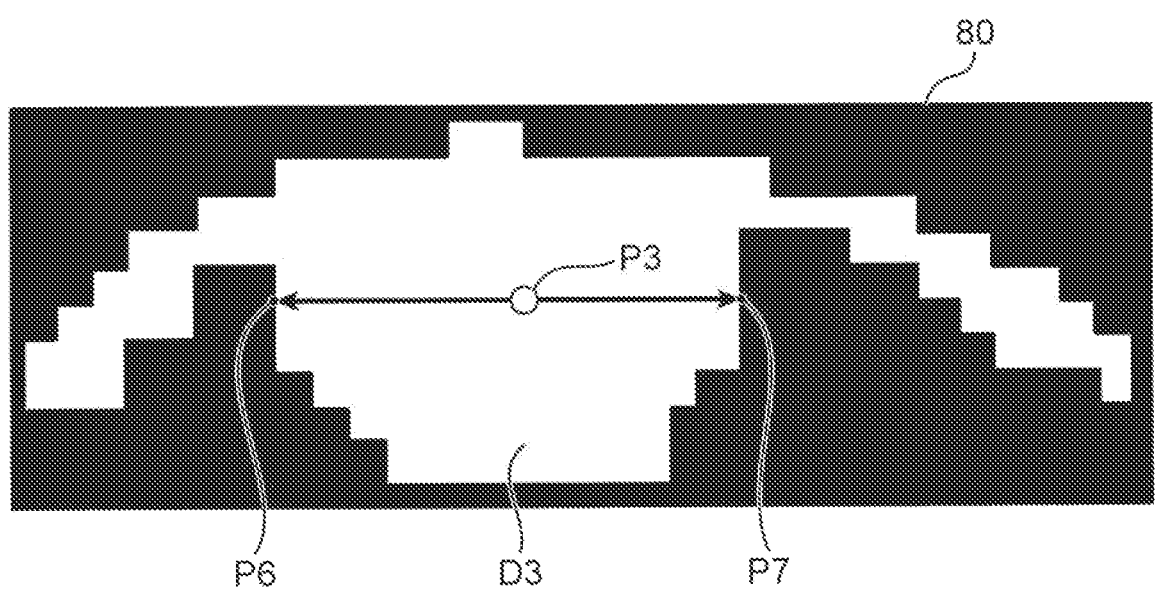
FIG. 14 is an illustration showing a binary image where a leftmost pixel and a rightmost pixel of the colored part of an eye are detected.

In Step 45, the iris information calculation part 15 detects a leftmost pixel and a rightmost pixel of the colored part, respectively. FIG. 14 is an illustration showing a binary image 80 from which a leftmost pixel P6 (first pixel) and a rightmost pixel P7 (second pixel) of the colored part are detected. The replacement part 14 examines the change in luminance value pixel by pixel on the left and right of the estimated iris center position P3 in the X direction in the white region D3 of the binary image 80. Thereafter, the replacement part 14 detects a black pixel that first appears on the left in the X direction as the leftmost pixel P6, and detects a black pixel that first appears on the right in the X direction as the rightmost pixel P7.

In Step S46, the iris information calculation part 15 calculates a middle position between the leftmost pixel P6 and the rightmost pixel P7 as the X coordinate of the iris center position P0.

Figure 15:
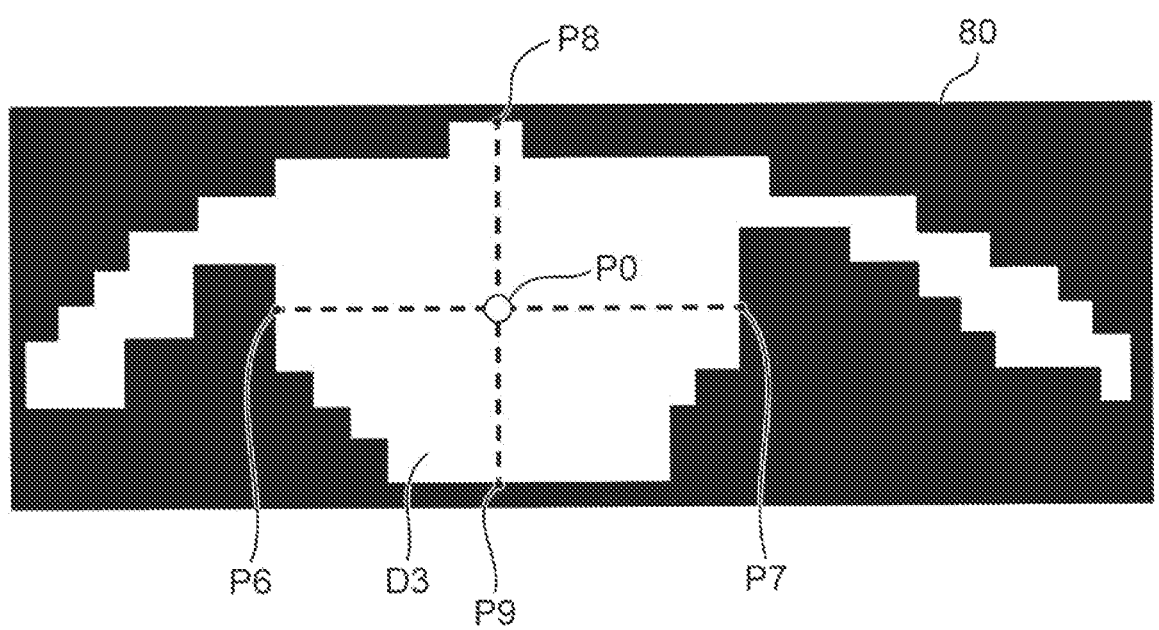
FIG. 15 is an illustration showing a binary image where an uppermost pixel and a lowermost pixel of the colored part of an eye are detected.

In Step S47, the iris information calculation part 15 detects an uppermost pixel and a lowermost pixel of the colored part, respectively. FIG. 15 is an illustration showing a binary image 80 from which an uppermost pixel P8 (third pixel) and a lowermost pixel P9 (fourth pixel) of the colored part are detected. The iris information calculation part 15 examines the change in the luminance value pixel by pixel upward and downward in the Y-direction passing the X coordinate of the iris center position P0 in the white region D3 of the binary image 80. Thereafter, the replacement part 14 detects a black pixel that first appears upward in the Y direction as the uppermost pixel P8, and detects a black pixel that first appears downward in the Y direction as the lowermost pixel P9.

In Step S48, the iris information calculation part 15 calculates a middle position between the uppermost pixel P8 and the lowermost pixel P9 as the Y coordinate of the iris center position P0. The iris center position P0 is calculated according to the flow described above.

In Step S49, the iris information calculation part 15 calculates an iris radius. Here, the iris information calculation part 15 may calculate a distance between the iris center position P0 and the leftmost pixel P6, a distance between the iris center position P0 and the rightmost pixel P7, or an average value of both distances as an iris radius. Alternatively, the iris information calculation part 15 may calculate a distance between the iris center position P0 and the uppermost pixel P8, a distance between the iris center position P0 and the lowermost pixel P9, or an average value of both distances as an iris radius. Further alternatively, the iris information calculation part 15 may calculate an average value of the four distances as an iris radius. When Step S49 finishes, the process proceeds to Step S8 in FIG. 3. Further, the iris information calculation part 15 may calculate, as an iris outer edge, a circle that is centered at the iris center position P0 and has the iris radius as a radius.

As described above, in the iris detection apparatus 1 according to Embodiment 1, a binary image 80 is generated to have a white region D1 in which a black pixel satisfying a predetermined condition has been replaced with a white pixel, and the iris information is calculated on the basis of the binary image 80. According to this processing, the black island-like area D2 appearing in the white region D1 corresponding to the colored part of an eye in the white region is blotted out by white pixels. As a result, the influence of external light or a background reflected on the cornea is suppressed, thereby enabling a further improvement in the detection accuracy of iris information.

Embodiment 2

Figure 16:
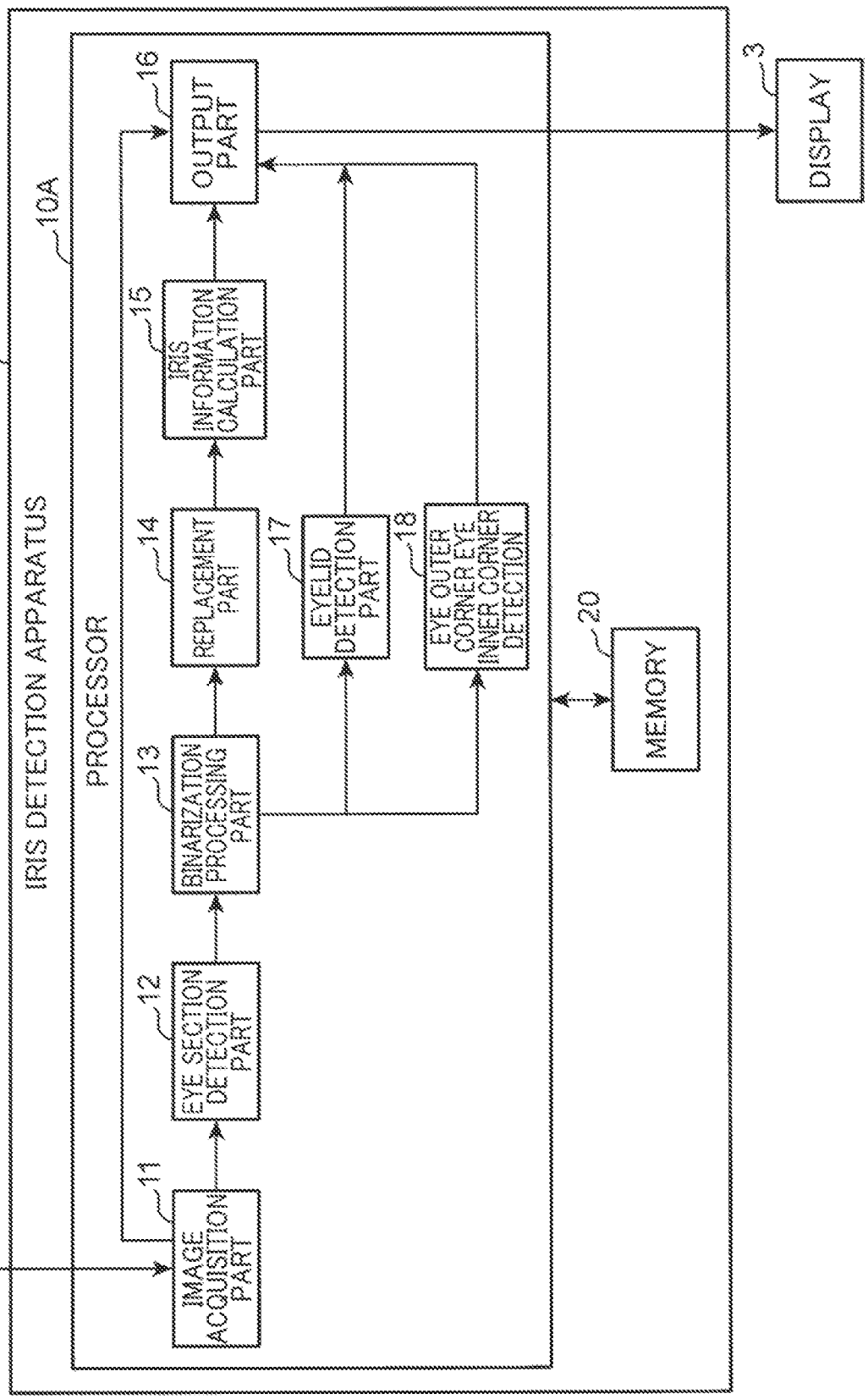
FIG. 16 is a block diagram showing an exemplary general configuration of an iris detection system according to Embodiment 2 of the present disclosure.

FIG. 16 is a block diagram showing an exemplary general configuration of an iris detection system 100A according to Embodiment 2 of the present disclosure. The iris detection apparatus 1A according to Embodiment 2 is configured to detect an eyelid, an eye outer corner, and an eye inner corner. In Embodiment 2, the same constituent elements as those of Embodiment 1 will be allotted with the same reference numerals. The description of the same elements will be omitted.

A processor 10A of the iris detection apparatus 1A includes an eyelid detection part 17 and an eye outer corner eye inner corner detection part 18 in addition to the processor 10 of the iris detection apparatus 1 according to Embodiment 1.

The eyelid detection part 17 detects positions of an upper eyelid and a lower eyelid of the person U1 from a binary image 70 generated by the binarization processing part 13. The eyelid detection part 17 may detect positions of the upper eyelid and the lower eyelid by applying a morphological gradient operation to the binary image 70. The eyelid detection part 17 detects positions of the upper eyelid and the lower eyelid from each of the left binary image 70 and the right binary image 70.

The eye outer corner eye inner corner detection part 18 detects positions of an eye outer corner and an eye inner corner from the binary image 70 generated by the binarization processing part 13. Here, the eye outer corner eye inner corner detection part 18 detects positions of the eye outer corner and the eye inner corner from each of the left binary image 70 and the right binary image 70.

Figure 17:
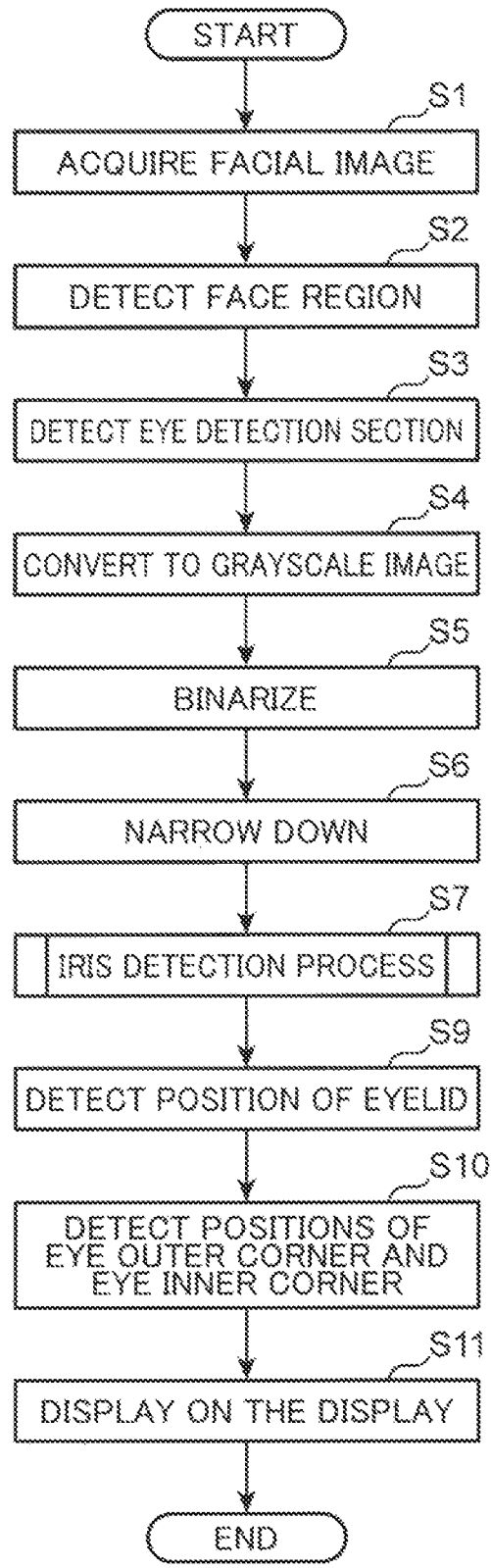
FIG. 17 is a flowchart showing an exemplary process of an iris detection apparatus according to Embodiment 2 of the present disclosure.

Hereinafter, processes by the iris detection apparatus 1A according to Embodiment 2 will be described. FIG. 17 is a flowchart showing an exemplary process of an iris detection apparatus 1A according to Embodiment 2 of the present disclosure. In the flowchart of FIG. 17, the same steps as those in FIG. 3 are allotted with the same step numbers. Further, Step S8 of FIG. 3 is omitted in FIG. 17.

Figure 18:
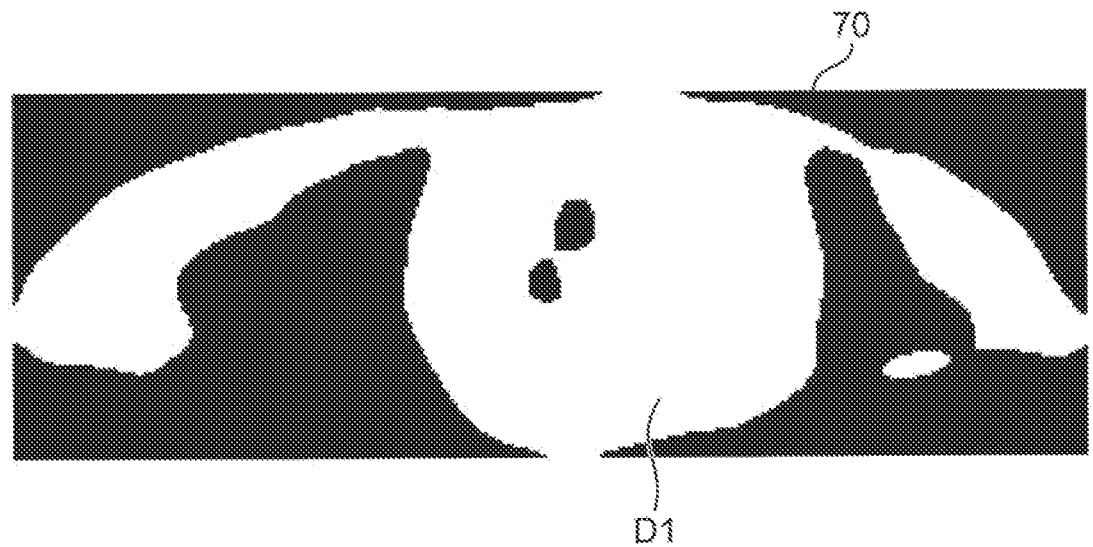
FIG. 18 is an illustration showing a binary image before applying a morphological gradient operation thereto.

In Step S9, which is subsequent to Step S7, the eyelid detection part 17 detects positions of the upper eyelid and the lower eyelid according to a morphological gradient operation. FIG. 18 is an illustration showing a binary image 70 before the execution of a morphological gradient operation.

Figure 19:
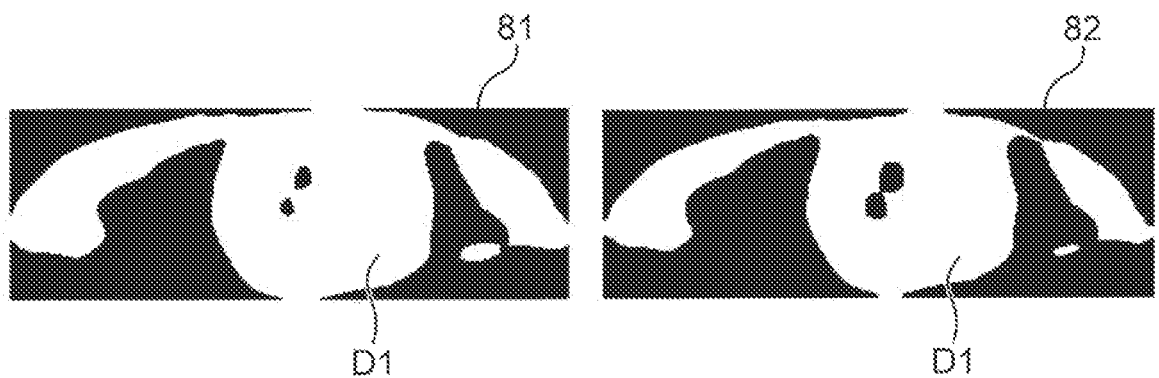
FIG. 19 is an illustration showing a dilated image and an eroded image where a binary image underwent a dilation process and an erosion process, respectively.

First, the eyelid detection part 17 applies a dilation process to the binary image 70. The dilation process is a process of replacing a specified pixel with a white pixel when there is at least one white pixel neighboring the specified pixel. Subsequently, the eyelid detection part 17 applies an erosion process to the binary image 70. The erosion process is a process of replacing a specified pixel with a black pixel when there is at least one black pixel neighboring the specified pixel. FIG. 19 is an illustration showing a dilated image 81 and an eroded image 82, which are obtained by applying the dilation process and the erosion process to the binary image 70, respectively.

Owing to the execution of the dilation process, the dilated image 81 includes a white region D1 more dilated than the white region D1 included in the binary image 70. Owing to the execution of the erosion process, the eroded image 82 includes a white region D1 more eroded than the white region D1 included in the binary image 70.

Figure 20:
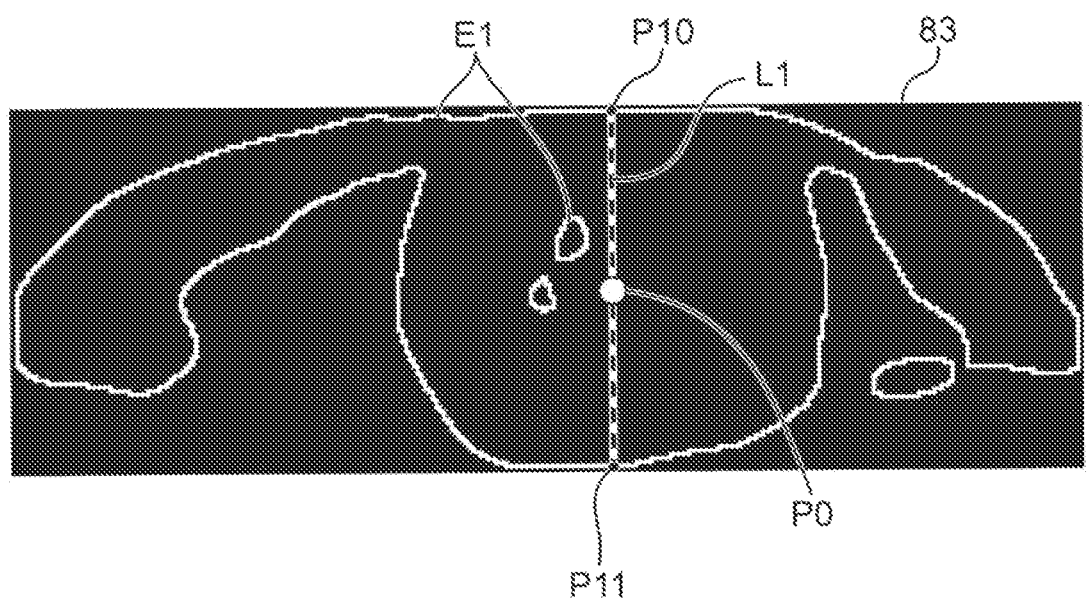
FIG. 20 is an illustration showing a gradient image.

Thereafter, the eyelid detection part 17 calculates a gradient image by subtracting the eroded image 82 from the dilated image 81. FIG. 20 is an illustration showing a gradient image 83. The gradient image 83 includes an edge E1 of the white region D1 of the binary image 70.

Subsequently, the eyelid detection part 17 detects an uppermost position of the edge E1 as an upper eyelid position P10. The eyelid detection part 17 may detect an upper intersection of a vertical line L1 passing through the iris center position P0 and the edge E1 as an upper eyelid position P10. Further, the eyelid detection part 17 detects a lower intersection of the vertical line L1 passing through the iris center position P0 and the edge E1 as a lower eyelid position P11. This enables a detection of the position of the lower eyelid, which has a small luminance variation and is liable to appear indistinctively in the binary image 70. The eyelid detection part 17 may detect an upper portion of the E1 connecting a left end and a right end of the gradient image 83 as an upper eyelid line.

Figure 21:
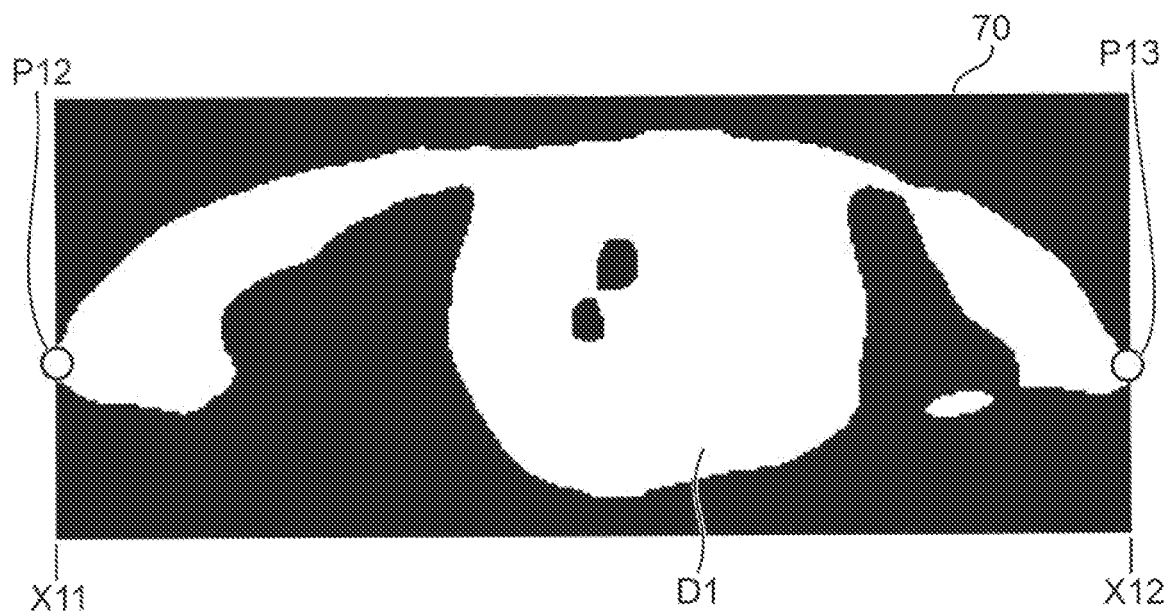
FIG. 21 is an illustration showing a binary image where an eye outer corner and an eye inner corner are detected.

In Step S10, the eye outer corner eye inner corner detection part 18 detects positions of the eye outer corner and the eye inner corner. FIG. 21 is an illustration showing a binary image 70 from which an eye outer corner and an eye inner corner are detected. The binary image 70 has a frame that is a circumscribed rectangle of the white region D1. Therefore, in the binary image 70, a leftmost X coordinate of the white region D1 coincides with a leftmost X coordinate (X11) of the binary image 70, and a rightmost X coordinate of the white region D1 coincides with a rightmost X coordinate (X12) of the binary image 70. Both X coordinates have been already calculated during the generation of the binary image 70. Thus, the eye outer corner eye inner corner detection part 18 calculates an eye outer corner position P12 and an eye inner corner position P13 using the already calculated both X coordinates. Since FIG. 21 is a left binary image 70, the left end of the white region D1 coincides with the eye outer corner position P12, and the right end of the white region D1 coincides with the eye inner corner position P13.

Specifically, the eye outer corner eye inner corner detection part 18 searches a white pixel in each pixel from the lower end to the upper end on the X coordinate (X11) of the binary image 70. Thereafter, the eye outer corner eye inner corner detection part 18 determines a Y coordinate of the first detected white pixel as the Y coordinate of the eye outer corner position P12. Similarly, the eye outer corner eye inner corner detection part 18 searches a white pixel in each pixel from the lower end to the upper end on the X coordinate (X12) of the binary image 70. Thereafter, the eye outer corner eye inner corner detection part 18 determines a Y coordinate of the first detected white pixel as the Y coordinate of the eye inner corner position P13. The eye outer corner position P12 and the eye inner corner position P13 are detected according to the flow described above.

Figure 22:
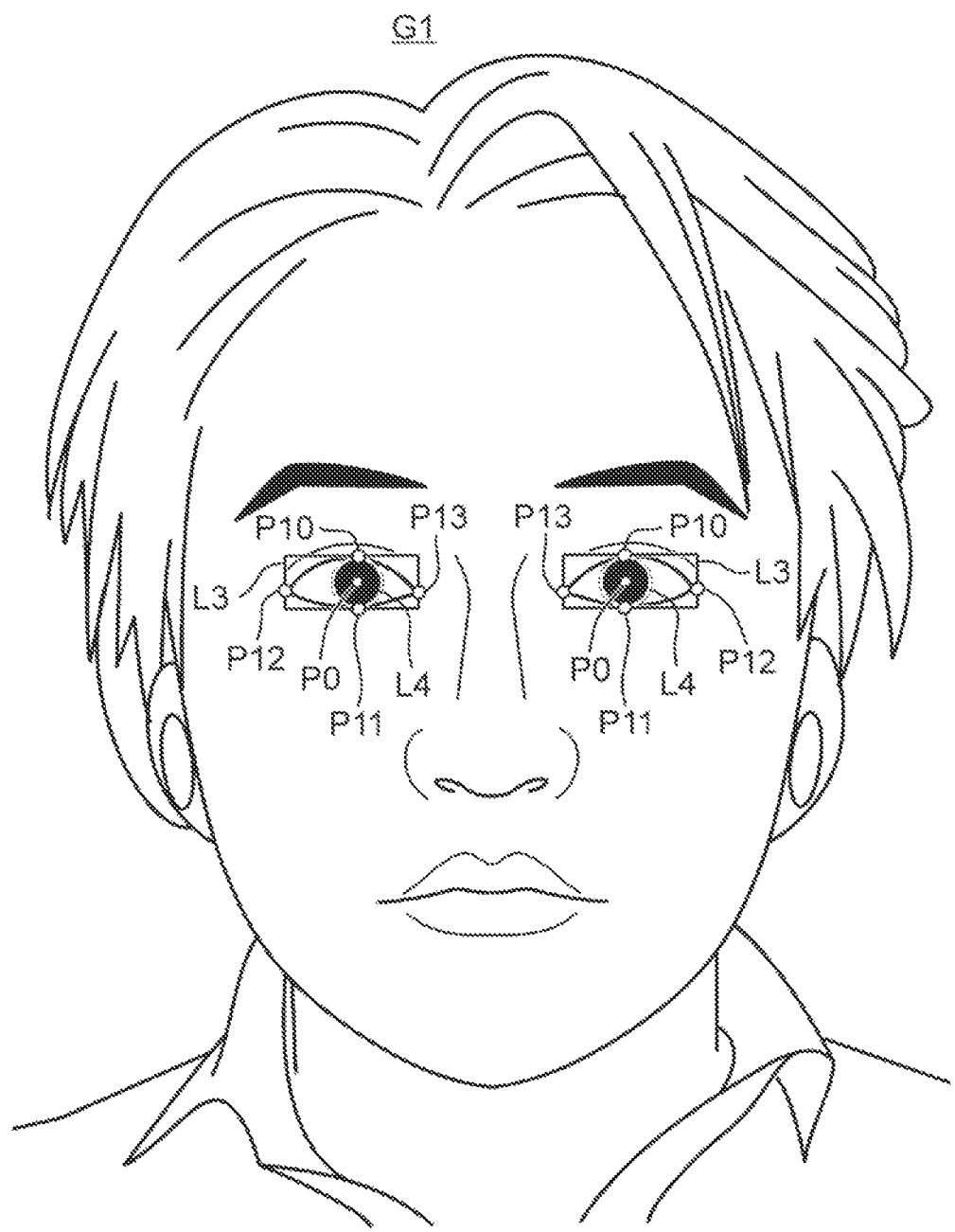
FIG. 22 is an illustration showing an exemplary display picture displayed on a display.

In Step S11, the output part 16 generates a display picture by superimposing the iris information over the facial image calculated in Step S1 and concurrently superimposing the eye outer corner position P12 and the eye inner corner position P13 over the facial image, and displays the display picture on the display 3. FIG. 22 is an illustration showing an exemplary display picture G1 displayed on a display 3. In the display picture G1, the iris center position P0 is superimposedly displayed at the center of the colored part of an eye. Additionally, the upper eyelid position P10, the lower eyelid position P11, the eye outer corner position P12, and the eye inner corner position P13 are superimposedly displayed over the facial image of the person U1. Further, a circle L4 showing an outer edge of the iris is superimposedly displayed over the facial image. This circle L4 is calculated using the iris radius included in the iris information. Furthermore, a rectangle L3 passing through the upper eyelid position P10, the eye outer corner position P12, the eye inner corner position P13, and the lower eyelid position P11 is superimposedly displayed over the facial image.

This causes the display picture G1 to display information about an eye of the person U1 such as the iris information over the facial image taken by the image taking device 2 in real time.

The present disclosure may adopt the following modifications.

(1) In Embodiments 1 and 2, the first luminance value represents white and the second luminance value represents black in the binary images 60, 70, and 80. However, the present disclosure is not limited to this configuration. The first luminance value may represent black, and the second luminance value may represent white.

Figure 23:
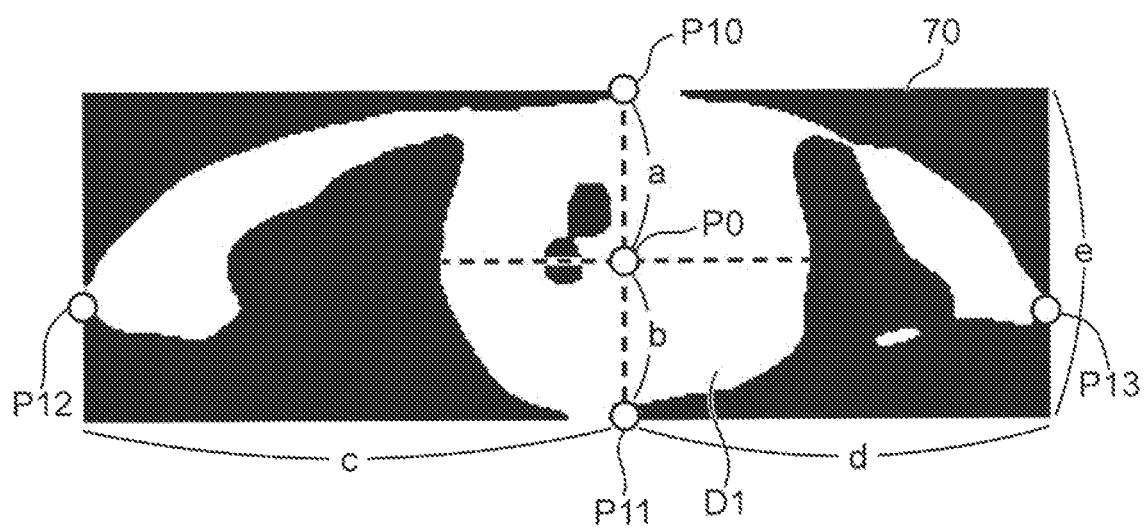
FIG. 23 is an illustration explaining information on an eye.

(2) The iris information calculation part 15 may further calculate the following information about an eye. FIG. 23 is an illustration explaining information about an eye. The information about an eye includes a distance a, a distance b, a distance c, a distance d, and a distance e.

The distance a is a distance between the upper eyelid position P10 and the iris center position P0. The distance a is calculated by: Y coordinate of Upper Eyelid Position P10−Y Coordinate of Iris Center Position P0.

The distance b is a distance between the lower eyelid position P11 and the iris center position P0. The distance b is calculated by: Y Coordinate of Iris Center Position P0−Y coordinate of Lower Eyelid Position P11.

The distance c is a distance between the eye outer corner position P12 and the iris center position P0. In the case of the left eye, the distance c is calculated by: X Coordinate of Iris Center Position P0−X Coordinate of Eye Outer Corner Position P12.

The distance d is a distance between the eye inner corner position P13 and the iris center position P0. In the case of the left eye, the distance d is calculated by: X Coordinate of Eye Inner Corner Position P13−X Coordinate of Iris Center Position P0.

The distance e is a distance between upper and lower eyelids. The distance e is calculated by: Y Coordinate of Upper Eyelid Position P10−Y Coordinate of Lower Eyelid Position P11.

This enables an estimation of an emotion of the person U1 and a state of the person.

(3) The iris information calculation part 15 may further calculate information about both eyes of the person U1. The information about both eyes includes an outer canthal distance, an inner canthal distance, and an interpupillary distance. The outer canthal distance is a distance between left and right eye outer corners. The outer canthal distance is calculated by: X Coordinate of Right Eye Outer Corner Position P13−X Coordinate of Left Eye Outer Corner Position P13.

The inner canthal distance is a distance between left and right eye inner corners. The inner canthal distance is calculated by: X Coordinate of Right Eye Timer Corner Position P12−X Coordinate of Left Eye Inner Corner Position P12.

The interpupillary distance is a distance between left and right iris center positions P0. The interpupillary distance is calculated by: X Coordinate of Right Iris Center Position P0−X Coordinate of Left Iris Center Position P0.

Further, the iris information calculation part 15 may calculate: Inner Canthal Distance/Interpupillary Distance; and Outer Canthal Distance/Inner Canthal Distance as information about the eye of the person U1.

(4) An iris diameter having a size larger or smaller than a size originally estimated as the iris diameter is liable to be detected due to an increase in the luminance of the colored part caused by some reflection of external light and the like. In this case, the iris information is not accurately detectable. Accordingly, the iris information calculation part 15 may calculate the iris diameter and the distance between the eye outer corner and the eye inner corner, calculate a ratio of the iris diameter to the distance between the eye outer corner and the eye inner corner, and judge that the detection of the colored part of an eye is failed when the ratio does not fall within a predetermined reference ratio range. In this case, the iris information calculation part 15 may output an error signal to the output part 16 without outputting the iris information to the output part 16.

INDUSTRIAL APPLICABILITY

According to the present disclosure, the iris information can be accurately calculated. Thus, the disclosure is useful in the technical field of iris detection.

The invention claimed is:

1. An iris detection method for detecting an iris of a person image taken by an image taking device by a computer of an iris detection apparatus, the iris detection method comprising:
acquiring a first image including a face of a person;
generating a second image including an eye section of the person from the first image;
generating a third image where pixels having a gradation value smaller than a threshold value are represented by a first luminance value and pixels having a gradation value equal to or greater than the threshold value are represented by a second luminance value after binarizing the second image;

generating a fourth image by replacing a pixel in an island-like area having the second luminance value in the third image with a pixel of the first luminance value, the island-like area being surrounded by a first luminance area having the first luminance value;

calculating iris information including information about at least one of a position and a size of the iris of the person by use of the fourth image; and outputting the iris information, wherein in the generation of the fourth image, a plurality of vertical lines parallel to a vertical direction is set in the third image, an uppermost pixel which is a pixel of the first luminance value and first appears in an upper end side on each of the plurality of vertical lines of the third image and a lowermost pixel which is a pixel of the first luminance value and first appears in a lower end side on each of the vertical lines of the third image are respectively detected, for each of the vertical lines, it is judged whether a distance between the uppermost pixel and the lowermost pixel is longer than a first reference distance, and a pixel of the second luminance value that is included between the uppermost pixel and the lowermost pixel and is on a vertical line judged to have the distance be longer than the first reference distance is replaced with a pixel of the first luminance value.

2. The iris detection method according to claim 1, wherein the first luminance value is greater than the second luminance value, and in the generation of the fourth image, the third image is divided in a lateral direction into a plurality of local regions each having a predetermined number of pixels, an average luminance value of each local region is calculated, a center position of the local region having a highest average luminance value is calculated as an estimated iris center position, and a process of judging whether or not to replace a pixel of the first luminance or not is applied only to a pixel of the second luminance value within a second reference distance from the estimated iris center position on the vertical line.

3. The iris detection method according to claim 2, wherein in the calculation of the iris information, a first pixel which has the second luminance value and first appears from the estimated iris center position to a left side in the lateral direction in the third image and a second pixel which has the second luminance value and first appears from the estimated iris center position to a right side in the lateral direction in the third image are respectively detected, and a middle position between the first pixel and the second pixel is calculated as an iris center position in the lateral direction.

4. The iris detection method according to claim 2, wherein in the calculation of the iris information, a third pixel which has the second luminance value and first appears from the estimated iris center position to an upper side in a vertical direction in the third image and a fourth pixel which has the second luminance value and first appears from the estimated iris center position to a lower side in the vertical direction in the third image are respectively detected, and a middle position between the third pixel and the fourth pixel is calculated as an iris center position in the vertical direction.

5. The iris detection method according to claim 1, further comprising:

detecting respective positions of upper and lower eyelids based on the third image.

6. The iris detection method according to claim 5, wherein in the detection of the position of the eyelid, the position of the eyelid is detected by performing a morphological gradient operation to the third image.

7. The iris detection method according to claim 1, wherein the fourth image is a binary image of one of a left eye and a right eye of the person, further comprising detecting respective positions of an eye outer corner and an eye inner corner based on the third image.

8. The iris detection method according to claim 7, wherein in the detection of the respective positions of the eye outer corner and the eye inner corner in the third image, a position of a leftmost pixel having the first luminance value in the lateral direction is detected as a position of one of the eye outer corner and the eye inner corner, and a position of a rightmost pixel having the first luminance value in the lateral direction is detected as a position of the other of the eye outer corner and the eye inner corner.

9. The iris detection method according to claim 7, further comprising:

calculating information about both eyes of the person based on the positions of the eye outer corner and the eye inner corner.

10. The iris detection method according to claim 1, further comprising:

detecting positions of upper and lower eyelids and positions of an eye outer corner and an eye inner corner in the third image, and calculating a distance between the iris center position and the position of the upper eyelid, a distance between the iris center position and the position of the lower eyelid, a distance between the iris center position and the position of the eye outer corner, and a distance between the iris center position and the position of the eye inner corner based on the detection results.

11. The iris detection method according to claim 1, further comprising:

displaying the iris information in such a manner as to be superimposed on a facial image of the person shown on a display.

12. An iris detection apparatus for detecting an iris of a person image taken by an image taking device, the iris detection apparatus comprising:

a processor; and a non-transitory memory having stored thereon executable instructions, which cause the processor to perform:

acquiring a first image including a face of a person;

detecting a second image including an eye section of the person from the first image;

generating a third image where pixels having a luminance lower than a threshold value are represented by a first luminance value and pixels having a luminance equal to or higher than the threshold value are represented by a second luminance value after binarizing the second image;

generating a fourth image by replacing a pixel in an island-like area having the second luminance value in the third image with a pixel of the first luminance value, the island-like area being surrounded by a first luminance area having the first luminance value;

calculating iris information including information about at least one of a position and a size of the iris of the person by use of the fourth image; and outputting the iris information, wherein in the generation of the fourth image, a plurality of vertical lines parallel to a vertical direction is set in the third image, an uppermost pixel which is a pixel of the first luminance value and first appears in an upper end side on each of the plurality of vertical lines of the third image and a lowermost pixel which is a pixel of the first luminance value and first appears in a lower end side on each of the vertical lines of the third image are respectively detected, for each of the vertical lines, it is judged whether a distance between the uppermost pixel and the lowermost pixel is longer than a first reference distance, and a pixel of the second luminance value that is included between the uppermost pixel and the lowermost pixel and is on a vertical line judged to have the distance be longer than the first reference distance is replaced with a pixel of the first luminance value.

13. A non-transitory computer-readable recording medium recording an iris detection program causing a computer to perform an iris detection method for detecting an iris of a person image taken by an image taking device, the iris detection method comprising:

acquiring a first image including a face of a person;

detecting a second image including an eye section of the person from the first image;

generating a third image where pixels having a luminance lower than a threshold value are represented by a first luminance value and pixels having a luminance equal to or higher than the threshold value are represented by a second luminance value after binarizing the second image;

generating a fourth image by replacing a pixel in an island-like area having the second luminance value in the third image with a pixel of the first luminance value, the island-like area being surrounded by a first luminance area having the first luminance value;

calculating iris information including information about at least one of a position and a size of the iris of the person by use of the fourth image; and outputting the iris information, wherein in the generation of the fourth image, a plurality of vertical lines parallel to a vertical direction is set in the third image, an uppermost pixel which is a pixel of the first luminance value and first appears in an upper end side on each of the plurality of vertical lines of the third image and a lowermost pixel which is a pixel of the first luminance value and first appears in a lower end side on each of the vertical lines of the third image are respectively detected, for each of the vertical lines, it is judged whether a distance between the uppermost pixel and the lowermost pixel is longer than a first reference distance, and a pixel of the second luminance value that is included between the uppermost pixel and the lowermost pixel and is on a vertical line judged to have the distance be longer than the first reference distance is replaced with a pixel of the first luminance value.

* * * * *